(12) United States Patent
Tsuchida et al.

(10) Patent No.: US 7,649,825 B2
(45) Date of Patent: Jan. 19, 2010

(54) SPLITTING ELEMENT, LIGHT EMITTER, AND OPTICAL PICKUP APPARATUS

(75) Inventors: Kazuhiro Tsuchida, Higashihiroshima (JP); Toshiya Nagahama, Kashiba (JP); Keiji Sakai, Nara (JP); Tetsuo Ueyama, Nara (JP); Katsushige Masui, Higashihiroshima (JP); Naotaka Otsuka, Mihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 848 days.

(21) Appl. No.: 10/551,365

(22) PCT Filed: Mar. 19, 2004

(86) PCT No.: PCT/JP2004/003778

§ 371 (c)(1), (2), (4) Date: Sep. 28, 2005

(87) PCT Pub. No.: WO2004/088645

PCT Pub. Date: Oct. 14, 2004

(65) Prior Publication Data

US 2006/0262695 A1    Nov. 23, 2006

(30) Foreign Application Priority Data

Mar. 28, 2003    (JP) .............................. 2003-092110

(51) Int. Cl.
*G11B 7/00*    (2006.01)
(52) U.S. Cl. ............................ 369/112.07; 369/112.01; 369/112.12
(58) Field of Classification Search ............ 369/112.07, 369/112.1, 112.12
See application file for complete search history.

(56) References Cited

U.S. PATENT DOCUMENTS

| 5,881,035 | A | 3/1999 | Ueyama |
| 6,091,690 | A | 7/2000 | Sano et al. |
| 6,351,443 | B1* | 2/2002 | Freeman ................. 369/112.07 |
| 6,430,137 | B1* | 8/2002 | Saimi et al. .............. 369/112.1 |

(Continued)

FOREIGN PATENT DOCUMENTS

EP    1 443 505 A    8/2004

(Continued)

OTHER PUBLICATIONS

Supplementary European Search Report dated Apr. 9, 2008, directed to European Application No. 04 721 999.3.

(Continued)

*Primary Examiner*—Wayne Young
*Assistant Examiner*—Lixi Chow
(74) *Attorney, Agent, or Firm*—Morrison & Foerster LLP

(57) ABSTRACT

An object of the invention is to provide a splitter, a light emitter, and an optical pickup apparatus which can realize a stable track servo. Because of the structure of an optical system including an objective lens (27) and a hologram pattern (25), even when the hologram pattern (25) is irradiated with a reflected light from one recording layer other than another recording layer in a focused state, first and second TES splitting portions (35, 36) are not irradiated with the reflected light from the one recording layer, but the reflected light is led to an axis vicinity portion (38) only. Accordingly, light reception by first and second TES light receiving portions (45, 46) is prevented, accurate track position information and deviation information can be positively acquired, and troubles such as the objective lens (27) being driven beyond a movable range can be eliminated.

8 Claims, 32 Drawing Sheets

U.S. PATENT DOCUMENTS

| | | |
|---|---|---|
| 6,442,125 B1 | 8/2002 | Maeda et al. |
| 6,760,296 B1 * | 7/2004 | Baba et al. ............. 369/112.05 |
| 7,042,817 B2 * | 5/2006 | Tadano et al. ............ 369/44.23 |
| 7,200,076 B2 * | 4/2007 | Katayama ................ 369/44.32 |
| 7,359,295 B2 * | 4/2008 | Nakayama et al. ....... 369/44.37 |
| 2002/0024916 A1 | 2/2002 | Ueyama et al. |
| 2002/0110053 A1 | 8/2002 | Araki et al. |
| 2002/0141301 A1 * | 10/2002 | Ohnishi et al. ........... 369/44.29 |
| 2003/0016598 A1 * | 1/2003 | Tsuda ..................... 369/44.23 |
| 2005/0141391 A1 | 6/2005 | Ueyama et al. |

FOREIGN PATENT DOCUMENTS

| | | |
|---|---|---|
| JP | 9-161282 A | 6/1997 |
| JP | 10-312571 | 11/1998 |
| JP | 11-242824 A | 9/1999 |
| JP | 2002-092933 A | 3/2002 |
| JP | 2002-237063 A | 8/2002 |

OTHER PUBLICATIONS

International Preliminary Report on Patentability for PCT Application No. PCT/JP2004/003778 mailed on Feb. 21, 2006, four pages.

International Search Report mailed on May 25, 2004 for PCT Application No. PCT/JP2004/003778 filed on Mar. 19, 2004, one page.

\* cited by examiner

SPLITTING ELEMENT, LIGHT EMITTER, AND OPTICAL PICKUP APPARATUS

CROSS-REFERENCE TO RELATED APPLICATIONS

This application is a National Phase filing 35 U.S.C. §371 of International Application No. PTC/JP2004/003778 filed on Mar. 19, 2004, and which claims priority to Japanese Patent No. 2003-092110 filed on Mar. 28, 2003, the contents of each of which are incorporated herein by reference in their entirety.

TECHNICAL FIELD

The present invention relates to a splitting element, a light emitter, and an optical pickup apparatus, for recording and/or reproduction of information to/from a recording medium.

BACKGROUND ART

FIG. 28 is a perspective view showing a configuration of a conventional art optical pickup apparatus 1. FIG. 29 is a front view showing a hologram pattern 10. In a conventional art optical pickup apparatus, a light receiving element receives reflected light from a recording medium and thus, a positional shift with respect to an optical axis of an objective lens is detected (refer to, for instance, Japanese Unexamined Patent Publications JP-A 2002-92933 and JP-A 2002-237063). The conventional art optical pickup apparatus 1 shown in FIG. 29 comprises a light source 2, a grating lens 3, collimation lens 4, an objective lens 5, a hologram element 6, and light receiving elements 7a to 7h.

Light from the light source 2 is split into one main beam 13a and two sub beams 13b and 13c by the grating lens 3 and then transmitted by the hologram element 6 and the collimation lens 7, and led to the objective lens 5. A first recording layer 9a of a recording medium 8 in a collected state is irradiated with the main beam 13a and respective sub beams 13b and 13c led to the objective lens 5. The main beam 13a and respective sub beams 13b and 13c reflected by the first recording layer 9a are transmitted by the objective lens 5 and the collimation lens 4, and led to the hologram element 6.

The hologram element 6 has the hologram pattern 10. The hologram pattern 10 has a first region 10a, a second region 10b, and a third region 10c. The first region 10a is one region in two half circles obtained by a parting line 11 passing through a center 10d of a circular region. The second region 10b is one region in two sectoral regions of the other half circle region, which sectoral regions obtained by a parting line 12 passing though the center 10d of the circular region and being perpendicular to the parting line 11. The third region 10c is the other region in the two sectoral regions.

FIG. 30 is a view for explaining light from the first recording layer 9a in a state where the objective lens 5 is located at a neutral position. FIG. 31 is a view for explaining light led to the respective light receiving elements 7a to 7h in a state where the objective lens 5 is located at the neutral position. FIG. 32 is a view for explaining one example of light from the first recording layer 9a in a state where the objective lens 5 is located at a position which is shifted in a radial direction A from the neutral position. FIG. 33 is a view for explaining one example of light led to the respective light receiving elements 7a to 7h in a state where the objective lens 5 is located at the position which is shifted in the radial direction A from the neutral position. FIG. 34 is a view for explaining another example of light from the recording medium 8 in a state where the objective lens 5 is located at the position which is shifted in the radial direction A from the neutral position. FIG. 35 is a view for explaining another example of the light led to the respective light receiving elements 7a to 7h in a state where the objective lens 5 is located at the position which is shifted in the radial direction A from the neutral position. When the objective lens 5 is located at the neutral position, the main beam 13a from the first recording layer 9a has an optical axis thereof passing through the center 10d of the hologram pattern 10, thereby enters the hologram element 6. At the time, the main beam 13a and respective sub beams 13b and 13c from the first recording layer 9a enter the second region 13b and the third region 13c at the same ratio, respectively.

When the objective lens 5 is disposed at a position which is shifted in the radial direction A from the neutral position, the main beam 13a from the first recording layer 9a has the optical axis thereof being displaced along the parting line 11. At this time, the main beam 13a from the first recording layer 9a enters either the second region 10b or the third region 10c in a biased state as shown in FIGS. 32 to 35. The main beam 13a and the respective sub beams 13b and 13c from the first recording layer 9a are diffracted by the respective first to third regions 10a to 10c.

The light which has entered the first region 10a from the first recording layer 9a is diffracted and led to the light receiving elements 7a and 7b in order to detect a focus error signal. On the basis of a light receiving result by the light receiving elements 7a and 7b, the focus error signal is detected. Among the reflected lights which have entered the second region 10b from the first recording layer 9a, the main beam 13a is led to the light receiving element 7c, and the respective sub beams 13b and 13c are respectively led to the respective light receiving elements 7e and 7g. Among the reflected lights which have entered the third region 10c from the first recording layer 9a, the main beam 13a is led to the light receiving element 7d, and the respective sub beams 13b and 13c are respectively led to the respective light receiving elements 7f and 7h. On the basis of a light receiving result by the respective light receiving elements 7c, 7e and 7g corresponding to the second region 10b, and the light receiving result by the respective light receiving elements 7d, 7f and 7h corresponding to the third region 10c, the lens position signal is detected. By so doing, a positional shift of the objective lens 5 in the radial direction A from the neutral position can be obtained.

FIG. 36 is a view for explaining reflected lights from the first and second recording layers 9a and 9b. FIG. 37 is a view for explaining a reflected light from the second recording layer 9b in a state where the objective lens 5 is located at the neutral position. FIG. 38 is a view for explaining one example of a reflected light from the second recording layer 9b in a state where the objective lens 5 is located at a position which is shifted in the radial direction A from the neutral position. FIG. 39 is a view for explaining another example of a reflected light from the second recording layer 9b in a state where the objective lens 5 is located at the position which is shifted in the radial direction A from the neutral position. FIG. 40 is a graph showing a relation between a position of the objective lens 5 in the radial direction A, and an output value by the respective light receiving elements 7a to 7h. In the above-described optical pickup apparatus 1, in a case where light from the light source 2 is collected onto the first recording layer 9a, as shown by a virtual line 14 in FIGS. 28 and 36, a part of the light is transmitted by the first recording layer 9a and reflected by the second recording layer 9b.

Since the second recording layer 9 is located at a position away from the objective lens 5 compared to the first recording layer 9a, the reflected light from the second recording layer 9b is reflected at a position which is further away than a focal length of the objective lens 5, and enters the hologram element 6 in a state of being focused by the objective lens 5 and the collimation lens 4. When diffracted by the hologram element 6, the reflected light from the second recording layer 9b enters a plurality of the light receiving elements with a larger spot size as shown by virtual lines 14a to 14c in FIGS. 37 to 39.

When the objective lens 5 is located at the neutral position, the output value shown by a lens position signal based on the reflected light from the first recording layer 9a. However, an output value shown by a lens position signal based on a reflected light from the second recording layer 9b does not become zero in the respective light receiving elements 7e to 7h for receiving the respective sub beams 13b and 13c because the sub beam 14b, for instance, enters the light receiving element 7g.

Further, when the objective lens 5 is located at the position which is shifted from the neutral position, there is a case where the reflected light from the second recording layer 9b enters only either the second region 10b or the third region 10c of the hologram pattern 10. In this case, in a range of entering only either one of the second and third regions 10b and 10c, the reflected light from the second recording layer 9b enters the respective light receiving elements corresponding to the one region. At the time, the output value due to the receiving elements 7e to 7h for receiving sub beams becomes constant even when the objective lens 5 is displaced and therefore, an offset occurs in the output value shown by the lens position signal.

Moreover, among the reflected lights from the second recording layer 9b, when the main beam 14a enters the light receiving element for receiving the sub beam, an error component becomes larger because the main beam 14a has higher optical strength than the sub beam. A relation between an actual position of the objective lens 5 in the radial direction A, and an output value obtained by the sub beam 13 from the first recording layer 9a is shown by a graph which inclines largely due to the error component and which has a nonlinear property as shown by a solid line 15 in FIG. 40 due to the offset. This also gives a nonlinear property to a graph 16 showing a relation between the position of the objective lens 5 in the radial direction A, and the output value shown by the lens position signal. Since a nonlinear property which is different from an ideal graph 17 having a linear property is thus obtained, it is not possible to correctly obtain a position of the objective lens in relation to the neutral position with respect to the radial direction A.

Moreover, there is an optical pickup apparatus having a configuration that two light receiving elements are further provided at a position that the reflected light from the second recording layer 9b enters and a difference is secured, whereby offsetting the error component. In this optical pickup apparatus, there is only an effect on the focus error signal, and it is not possible to solve a state where the reflected light from the second recording layer 9b enters only either the second region 20b or the third region 10c. Accordingly, it is not possible to improve nonlinearity with respect to the lens position signal.

Moreover, just as the spot size of the reflected light from the second recording layer 9b becomes smaller in the receiving elements 7a to 7h, it can be thought of making the spot size of the reflected light from the second recording layer 9b larger in the hologram pattern 10. The spot size of the reflected light in the hologram element 6 and the respective light receiving elements 7a to 7h is determined by a distance between the respective layers 9a and 9b of the recording medium 8, and a lens magnification of optical system including the collimation lens 4 and the objective lens 5. The distance between the respective layers 9a and 9b of the recording medium 8 is previously determined by a standard. Moreover, the lens magnification of optical system is determined by a radiation angle of a light emitting element used as the light source 2. Thus, the distance between the respective layers 9a and, 9b of the recording medium 8 and the lens magnification of optical system cannot be easily changed for reasons of a configuration of an apparatus because, for instance, a trouble occurs in the apparatus when changed more than is necessary. In the conventional art optical pickup apparatus 1, it is thus not possible to realize a stable track servo since a correct lens position cannot be obtained.

DISCLOSURE OF INVENTION

Accordingly, an object of the invention is to provide a splitter, a light emitter, and an optical pickup apparatus which can realize a stable track servo.

The invention is an optical pickup apparatus for recording and/or reproducing main information by irradiating with light a recording medium formed of a plurality of recording layers, the optical pickup apparatus comprising:

a light source;

light collecting means for collecting emitted light emitted from the light source onto one recording layer of the recording medium, the light collecting means being provided so as to be displaceable in a variable direction perpendicular to an optical axis of the emitted light within a movable range including a neutral position centering on the optical axis of the emitted light led to the light collecting means, and by the displacement in the movable direction, changing a light collection position in the recording medium of the emitted light;

light receiving means for receiving reflected light reflected by the recording medium, the light receiving means having first and second light receiving portions for obtaining track position information which is information of the light collection position of the emitted light with respect to a direction parallel to the recording layer, and shift information of the light collecting means from the neutral position, and a third light receiving portion for obtaining focus position information which is information of the light collection position of the emitted light with respect to a direction perpendicular to the recording layer;

splitting means having a first splitting portion, a second splitting portion, and a third splitting portion, for leading the reflected light via the light collecting means and splitting the reflected light on the respective first to third splitting portions, the first splitting portion leading the reflected light to the first light receiving portion, the second splitting portion leading the reflected light to the second light receiving portion, the third splitting portion leading the reflected light to the third light receiving portion, the first and second splitting portions being disposed in a residual region excluding an axial vicinity portion in a vicinity of a splitting axial line corresponding to an optical axis of the reflected light led to the splitting means when the light collecting means is located at the neutral position; and control means for obtaining the track position information and shift information by a result of light reception by the light receiving means and, controlling the light collection position of the emitted light in the recording medium by controlling a position of the light collecting means based on the track position information and shift information.

According to the invention, when the main information is recorded or reproduced, the recording medium formed of the plurality of the recording layers is irradiated with the emitted light from the light source. The emitted light from the light source is led to the light collecting means, and by which the emitted light is collected onto one of the recording layers of the recording medium. The light collecting means is provided so as to be displaceable in the variable direction perpendicular to the optical axis of the emitted light in the movable range including the neutral position centering on the optical axis of the led emitted light. Depending on displacement in the variable direction of the light collecting means, the light collection position in the recording medium of the emitted light varies.

The reflected light reflected by the recording medium is led to the splitting means via the light collecting means. The splitting means has the first splitting portion, the second splitting portion, and the third splitting portion. The first and second splitting portions are disposed in the residual region excluding the axial vicinity portion in the vicinity of the splitting axial line corresponding to the optical axis of the reflected light led to the splitting means when the light collecting means is located at the neutral position. The splitting means splits the reflected light on the respective first to third splitting portions, and leads the reflected light to the light receiving means having the first to third light receiving portions. The first splitting portion leads the split reflected light to the first light receiving portion for obtaining the track position information which is the information of the light collection position of the emitted light with respect to the direction parallel to the recording layer, and the shift information of the light receiving means from the neutral position. The second splitting portion leads the split reflected light to the second light receiving portion for obtaining the track position information and shift information. The third splitting position leads the split reflected light to the third light receiving portion for obtaining the focus position information which is the information of the light collection position of the emitted light with respect to the direction perpendicular to the recording layer.

The control means obtains, based on the result of light reception by the light receiving means, the track position information which is the information of the light collection position of the emitted light with respect to the direction parallel to the recording layer, and the shift information of the light collecting means from the neutral position. The control means controls the position of the light collecting means based on the obtained track position information and shift information. By so doing, the light collection position of the emitted light in the recording medium is controlled.

Since the optical pickup apparatus is thus configured, the configuration of optical system including the light collecting means, the splitting means, and the like prevent the reflected light from the other recording layer from entering the first and second splitting portions by being led to the axial vicinity portion, even when the reflected light from the other recording layers except for one recording layer is irradiated in a state of being focused on the splitting means. This makes it possible to reliably obtain the correct track position information and shift information by preventing the reflected light from being received by the first light receiving portion and the second light receiving portion. By obtaining the correct shift information, it is possible to solve troubles such that the light collecting means is driven beyond the movable range. Furthermore, by obtaining the correct track position information and shift information, the light collecting means can be correctly controlled, and thereby the light collection position of the emitted light in the recording medium can be correctly controlled. Consequently, a stable track servo can be realized.

Further, the invention is characterized in that, in the splitting means, the axial vicinity portion is formed in a region including a mobilization regional portion at the time that a radiation range of the reflected light reflected by the other recording layers is displaced along with the displacement of the light collecting means, in a case where the radiation range of the reflected light reflected by the other recording layers except for the one recording layer is smaller than a radiation range of the reflected light reflected by the one recording layer.

According to the invention, in the splitting means, the axial vicinity portion is formed in the region including the mobilization regional portion at the time that the radiation range of the reflected light reflected by the other recording layers is displaced along with the displacement of the light collecting means, in a case where the radiation range of the reflected light reflected by the other recording layers except for the one recording layer is smaller than the radiation range of the reflected light reflected by the one recording layer. By so doing, the reflected light reflected by the other recording layers is prevented from being led to the first and second splitting portions, and can be reliably led to only the axial vicinity portion even when the light collecting means is displaced in the direction perpendicular to the optical axis of the emitted light led to the light collecting means so that the light collection position of the emitted light in the recording medium is changed.

Further, the invention is characterized in that, in a case where the light collection position of the emitted light is located on the one recording layer, the reflected light reflected by the other recording layers is irradiated onto the splitting means in the radiation range which is smaller than that of the reflected light reflected by the one recording layer.

According to the invention, in a case where the light collection position of the emitted light is located on the one recording layer, the reflected light reflected by the other recording layers is irradiated onto the splitting means in the radiation range which is smaller than that of the reflected light reflected by the one recording layer. This makes it possible to make a region in which the axial vicinity portion is formed, as small as possible, and to make a light intensity of the reflected light led to the first and second splitting portions, as high as possible.

Further, the invention is characterized in that the light source emits light whose central wavelength is within a wavelength range of 650 nanometer or more and 660 nanometer or less.

According to the invention, the light source is configured so as to emit the light whose central wavelength is within the wavelength range of 650 nanometer or more and 660 nanometer or less and therefore, convenience can be enhanced with respect to the recording medium such as a digital versatile disk (abbreviated as DVD), for instance.

Further, the invention is characterized in that the optical pickup apparatus further comprises diffracting means interposed between the light source and the light collecting means, for partly diffracting the emitted light, and forming a main beam for obtaining the main information recorded on the recording medium, and a sub beam for obtaining the position information for controlling the light collection position of the main beam.

According to the invention, the diffracting means is interposed between the light source and the light collecting means, and partly diffracts the emitted light from the light source. By diffracting the emitted light from the light source, there are formed the main beam for obtaining the main information recorded on the recording medium, and the sub beam for obtaining the position information for controlling the light collection position of the main beam. Even in a case where the main beam and the sub beam are thus used, the main beam and the sub beam which are reflected by the other recording layers can be led to only the axial vicinity portion after preventing the beams from being led to the first and second splitting portions. This makes it possible to reliably obtain the correct track position information and shift information.

Further, the invention is characterized in that the control means obtains the focus position information in accordance with a knife-edge method based on the result of the light reception by the third light receiving portion, and controls the position of the light collecting means based on the focus position information, and thereby the light collection position of the emitted light in the recording medium is controlled.

According to the invention, the control means obtains the focus position information in accordance with the knife-edge method based on the result of the light reception by the third light receiving portion. The control means controls the position of the light collecting means based on the obtained focus position information, and thereby the light collection position of the emitted light in the recording medium is controlled. This makes it possible to enhance convenience by, for instance, obtaining the correct focus position information.

Further, the invention is characterized in that the control means obtains the track position information in accordance with a phase contrast method based on the result of the light reception by the first light receiving portion and the result of the light reception by the second light receiving portion, and controls the position of the light collecting means, and thereby the light collection position of the emitted light in the recording medium is controlled.

According to the invention, the control means obtains the track position information in accordance with the phase contrast method based on the result of the light reception by the first light receiving portion and the result of the light reception by the second light receiving portion. The control means controls the position of the light collecting means based on the obtained track position information, and thereby the light collection position of the emitted light in the recording medium is controlled. This makes it possible to enhance convenience by, for instance, obtaining the correct track position information.

Further, the invention is characterized in that the control means obtains the track position information in accordance with a differential push pull method based on the result of the light reception by the first light receiving portion and the result of the light reception by the second light receiving portion, and controls the position of the light collecting means, and thereby the light collection position of the emitted light in the recording medium is controlled.

According to the invention, the control means obtains the track position information in accordance with the differential push pull method based on the result of the light reception by the first light receiving portion and the result of the light reception by the second light receiving portion. The control means controls the position of the light collecting means based on the obtained track position information, and thereby the light collection position of the emitted light in the recording medium is controlled. This makes it possible to enhance convenience by, for instance, obtaining the correct track position information.

Further, the invention is characterized in that the axial vicinity portion is a circular portion having a splitting axial line as a center.

According to the invention, the axial vicinity portion is a circular portion having the splitting axial line as a center and therefore, the reflected light from the other recording layers is made to enter the axial vicinity portion so as to reliably prevent the reflected light from entering the first and second splitting portions.

Further, the invention is a light emitter for an optical pickup apparatus which records or reproduces main information by irradiating a recording medium formed of a plurality of recording layers with light which is emitted from the light emitter and collected by light collecting means, and receiving by the light emitter the light reflected by the recording medium, the light collecting means collecting emitted light emitted from the light emitter onto one recording layer of the recording medium, and being provided so as to be displaceable in a variable direction perpendicular to an optical axis of the emitted light within a movable range including a neutral position which centers on the optical axis of the emitted light and by the displacement in the variable direction, whereby a light collection position of the emitted light in the recording medium is changed, the light emitter comprising:

a light source;

light receiving means for receiving reflected light reflected by the recording medium, the light receiving means having a first light receiving portion and a second light receiving portion for obtaining track position information which is information of the light collection position of the emitted light with respect to a direction parallel to a recording layer, and a third light receiving portion for obtaining focus position information which is information of the light collection position of the emitted light with respect to a direction perpendicular to the recording layer; and splitting means having a first splitting portion, a second splitting portion, and a third splitting portion, the splitting means leading the reflected light via the light collecting means and splitting the reflected light on the respective first to third splitting portions, the first splitting portion leading the light to a first light receiving portion, the second splitting portion leading the light to a second light receiving portion, the third splitting portion leading the light to a third light receiving portion, the first and second splitting portions being disposed in a residual region excluding an axial vicinity portion in a vicinity of a splitting axial line corresponding to an optical axis of the reflected light led to the splitting means when the light collecting means is located at the neutral position.

According to the invention, the light emitter is provided on the optical pickup apparatus. The light collecting means collects the emitted light emitted from the light emitter onto one recording layer of the recording medium. Furthermore, the light collecting means is provided so as to be displaceable in the variable direction perpendicular to the optical axis of the emitted light within the movable range including the neutral position which range is coaxial with the optical axis of the emitted light and by this displacement to the variable direction is changed the light collection position of the emitted light in the recording medium. The optical pickup apparatus can record or reproduce the main information by making the light collecting means collect the light from the light emitter and irradiating with the light the recording medium on which the plurality of the recording layers is formed, and then receiving by the light emitter the light reflected by the recording medium.

The light receiving means receives the reflected light which has been emitted from the light source and reflected by the recording medium. The light receiving means has the first light receiving portion and the second light receiving portion for obtaining the track position information which is the information of the light collection position of the emitted light with respect to the direction parallel to the recording layer, and the third light receiving portion for obtaining the focus position information which is the information of the light collection position of the emitted light with respect to the direction perpendicular to the recording layer. The splitting means has the first splitting portion, the second splitting portion, and the third splitting portion. The reflected light is led via the light collecting means. The splitting means splits the reflected light on the respective first to third splitting portions. The first splitting portion leads the light to the first light receiving portion, and the second splitting portion leads the light to the second light receiving portion, and the third splitting portion leads the light to the third light receiving portion. The first and second splitting portions of the splitting means are disposed in the residual region excluding the axial vicinity portion in the vicinity of the splitting axial line corresponding to the optical axis of the reflected light led to the splitting means when the light collecting means is located at the neutral position.

By providing the thus configured light emitter on the optical pickup apparatus, even when the reflected light from the other recording layers except for the one recording layer is irradiated in a state of being focused on the splitting means, the reflected light from the other recording layer is led to the axial vicinity portion, and prevented from entering the first and second splitting portions. This prevents the reflected light from being received by the first light receiving portion and the second light receiving portion, so that the correct track position information and shift information can be reliably obtained. By obtaining the correct shift information, it is possible to solve troubles such that the light collecting means is driven beyond the movable range. Furthermore, by obtaining the correct track position information and shift information, the light collecting means can be correctly controlled, and thereby the light collection position of the emitted light in the recording medium can be correctly controlled. Consequently, a stable track servo can be realized.

Further, the invention is characterized in that, in the splitting means, the axial vicinity portion is formed in a region including a mobilization regional portion at the time that a radiation range of the reflected light reflected by the other recording layers is displaced along with the displacement of the light collecting means, in a case where the radiation range of the reflected light reflected by the other recording layers except for the one recording layer is smaller than that of the radiation range of the reflected light reflected by the one recording layer.

According to the invention, in the splitting means, the axial vicinity portion is formed in the region including the mobilization regional portion at the time that the radiation range of the reflected light reflected by the other recording layers is displaced along with the displacement of the light collecting means, in a case where the radiation range of the reflected light reflected by the other recording layers except for the one recording layer is smaller than that of the radiation range of the reflected light reflected by the one recording layer. By so doing, the reflected light reflected by the other recording layers is prevented from being led to the first and second splitting portions, and can be reliably led to only the axial vicinity portion, even when the light collecting means is displaced so that the light collection position of the emitted light in the recording medium is changed.

Further, the invention is characterized in that, in a case where the light collection position of the emitted light is located on the one recording layer, the reflected light reflected by the other recording layers is irradiated onto the splitting means in the radiation range which is smaller than that of the reflected light reflected by the one recording layer.

According to the invention, in a case where the light collection position of the emitted light is located on the one recording layer, the reflected light reflected by the other recording layers is irradiated onto the splitting means in the radiation range which is smaller than that of the reflected light reflected by the one recording layer. This makes it possible to make a region in which the axial vicinity portion is formed, as small as possible, and to make a light intensity of the reflected light led to the first and second splitting portions, as high as possible.

Further, the invention is characterized in that the light source emits light whose central wavelength is within a wavelength range of 650 nanometer or more and 660 nanometer or less.

According to the invention, the light source is configured so as to emit the light whose central wavelength is within the wavelength range of 650 nanometer or more and 660 nanometer or less and therefore, convenience can be enhanced with respect to the recording medium such as a digital versatile disk (abbreviated as DVD), for instance.

Further, the invention is characterized in that the light emitter further comprises diffracting means interposed between the light source and the light collecting means, for partly diffracting the emitted light, and forming a main beam for obtaining the main information recorded on the recording medium, and a sub beam for obtaining the position information for controlling the light collection position of the main beam.

According to the invention, the diffracting means is interposed between the light source and the light collecting means, and partly diffracts the emitted light from the light source. By diffracting the emitted light from the light source, there are formed the main beam for obtaining the main information recorded on the recording medium and the sub beam for obtaining the position information for controlling the light collection position of the main beam. Even in a case where the main beam and the sub beam are thus used, the main beam and the sub beam which are reflected by the other recording layers can be led to only the axial vicinity portion after preventing the beams from being led to the first and second splitting portions. This makes it possible to reliably obtain the correct main information and position information.

Further, the invention is characterized in that the light emitter is provided on an optical pickup apparatus for obtaining the focus position information in accordance with a knife-edge method based on a light receiving result in a plurality of light receiving elements of the third light receiving portion.

According to the invention, the light emitter is provided on the optical pickup apparatus for obtaining the focus position information in accordance with the knife-edge method based on the result of the light reception by the third light receiving portion. This makes it possible to enhance convenience by, for instance, obtaining the correct focus position information.

Further, the invention is characterized in that the light emitter is provided on an optical pickup apparatus for obtaining the track position information in accordance with a phase contrast method based on the result of the light reception by the first light receiving portion and the result of the light reception by the second light receiving portion.

According to the invention, the light emitter is provided on the optical pickup apparatus for obtaining the track position information in accordance with the phase contrast method based on the result of the light reception by the first light receiving portion and the result of the light reception by the second light receiving portion. This makes it possible to enhance convenience by, for instance, obtaining the correct track position information.

Further, the invention is characterized in that the light emitter is provided on an optical pickup apparatus for obtaining the track position information in accordance with a differential push pull method based on the result of the light reception by the first light receiving portion and the result of the light reception by the second light receiving portion.

According to the invention, the light emitter is provided on the optical pickup apparatus for obtaining the track position information in accordance with the differential push pull method based on the result of the light reception by the first light receiving portion and the result of the light reception by the second light receiving portion. This makes it possible to enhance convenience by, for instance, obtaining the correct track position information.

Further, the invention is characterized in that the axial vicinity portion is a circular portion having a splitting axial line as a center.

According to the invention, the axial vicinity portion is a circular portion having the splitting axial line as a center and therefore, the reflected light from the other recording layers is made to enter the axial vicinity portion so as to reliably prevent the reflected light from entering the first and second splitting portions.

Further, the invention is characterized in that the light emitter has a polarizing property of transmitting the emitted light from the light source and the reflected light from the recording medium without splitting the lights by the splitting means, and splitting the lights by the splitting means based on polarizing directions thereof.

According to the invention, the light emitter has the polarizing property of transmitting the emitted light from the light source and the reflected light from the recording medium without splitting the lights by the splitting means, and splitting the lights by the splitting means based on the respective polarizing directions. This makes it possible to enhance the usability of the light by, for instance, removing a loss of the light intensity at the time of irradiating the recording medium with the emitted light from the light source.

Further, the invention is characterized in that the light emitter further comprises light guiding means interposed between the light source and the light collecting means, the light guiding means leading the emitted light emitted from the light source to the light collecting means without splitting the emitted light, and leading the reflected light reflected by the recording medium to the splitting means.

According to the invention, the light guiding means is interposed between the light source and the light collecting means. The light guiding means leads the emitted light emitted from the light source to the light collecting means without splitting the emitted light, and leads the reflected light reflected by the recording medium to the splitting means. Since the emitted light from the light source is thus led to the recording medium via the splitting means, it is possible to enhance the usability of the light.

Further, the invention is characterized in that the light emitter further comprises polarizing direction changing means interposed between the splitting means and the light receiving means, for changing a polarizing direction of the reflected light from the recording medium to a direction which is different from a polarizing direction of the emitted light from the light source.

According to the invention, the polarizing direction changing means is interposed between the splitting means and the light receiving means. The polarizing direction changing means changes the polarizing direction of the reflected light from the recording medium to the direction which is different from the polarizing direction of the emitted light from the light source. By so doing, the emitted light from the light source can be transmitted without being diffracted by an optical component interposed between the light source and the recording medium, and the reflected light from the recording medium can be diffracted and reflected by the optical component. This makes it possible to enhance the usability of the light.

Further, the invention is a splitter provided on an optical pickup apparatus, the optical pickup apparatus recording and reproducing main information by making light collecting means collect light from a light source, and irradiating with the light a recording medium on which a plurality of recording layers is formed, and then receiving by receiving means light reflected by the recording medium, the light collecting means collecting an emitted light emitted from the light source onto one recording layer, and being provided so as to be displaceable in a variable direction perpendicular to an optical axis of the emitted light within a movable range including a neutral position which range is coaxial with the optical axis of the emitted light and by this displacement to the variable direction, changing a light collection position of the emitted light in the recording medium, the splitter comprising:

splitting means having a first splitting portion, a second splitting portion, and a third splitting portion, the splitter leading the reflected light reflected by the recording medium via the light collecting means and splitting the reflected light on the respective first to third splitting portions, the first splitting portion leading the light to a first light receiving portion, the second splitting portion leading the light to a second light receiving portion, the third splitting portion leading the light to a third light receiving portion, the first and second splitting portions being disposed in a residual region excluding an axial vicinity portion in a vicinity of a splitting axial line corresponding to an optical axis of the reflected light led to the splitting means when the light collecting means is located at the neutral position.

According to the invention, the splitter is provided on the optical pickup apparatus. The optical pickup apparatus has the light collecting means. The light collecting means collects the emitted light emitted from the light source onto the one recording layer of the recording medium, and is provided so as to be displaceable in the variable direction perpendicular to the optical axis of the emitted light in the movable range including the neutral position which range centers on the optical axis of the emitted light and by this displacement in the variable direction, changes the light collection position of the emitted light in the recording medium. This optical pickup apparatus can record or reproduce the main information by making the light collecting means collect the light from the light source, and irradiating with the light the recording medium on which the plurality of recording layers is formed, and then receiving by the receiving means the light reflected by the recording medium. The splitter has the first splitting portion, the second splitting portion, and the third splitting portion. The splitter leads the reflected light reflected by the recording medium via the light collecting means, and splits the reflected light on the respective first to third splitting portions. The first splitting portion leads the light to the first light receiving portion, and the second splitting portion leads the light to the second light receiving portion, and the third splitting portion leads the light to the third light receiving portion. The first and second splitting portions of the splitter is disposed in the residual region excluding the axial vicinity portion in the vicinity of the splitting axial line corresponding to the optical axis of the reflected light led to the splitting means when the light collecting means is located at the neutral position.

By providing the thus configured splitter on the optical pickup apparatus, even when the reflected light from the other recording layers except for the one recording layer is irradiated in a state of being focused on the splitter, the reflected light from the other recording layer is led to the axial vicinity portion, and prevented from entering the first and second splitting portions. This prevents the reflected light from being received by the first light receiving portion and the second light receiving portion, so that the correct track position information and shift information can be reliably obtained. By obtaining the correct shift information, it is possible to solve troubles such that the light collecting means is driven beyond the movable range. Furthermore, by obtaining the correct track position information and shift information, the light collecting means can be correctly controlled, and thereby the light collection position of the emitted light in the recording medium can be correctly controlled. Consequently, a stable track servo can be realized.

BRIEF DESCRIPTION OF DRAWINGS

Other and further objects, features, and advantages of the invention will be more explicit from the following detailed description taken with reference to the drawing wherein.

BEST MODE FOR CARRYING OUT THE INVENTION

Figure 1:
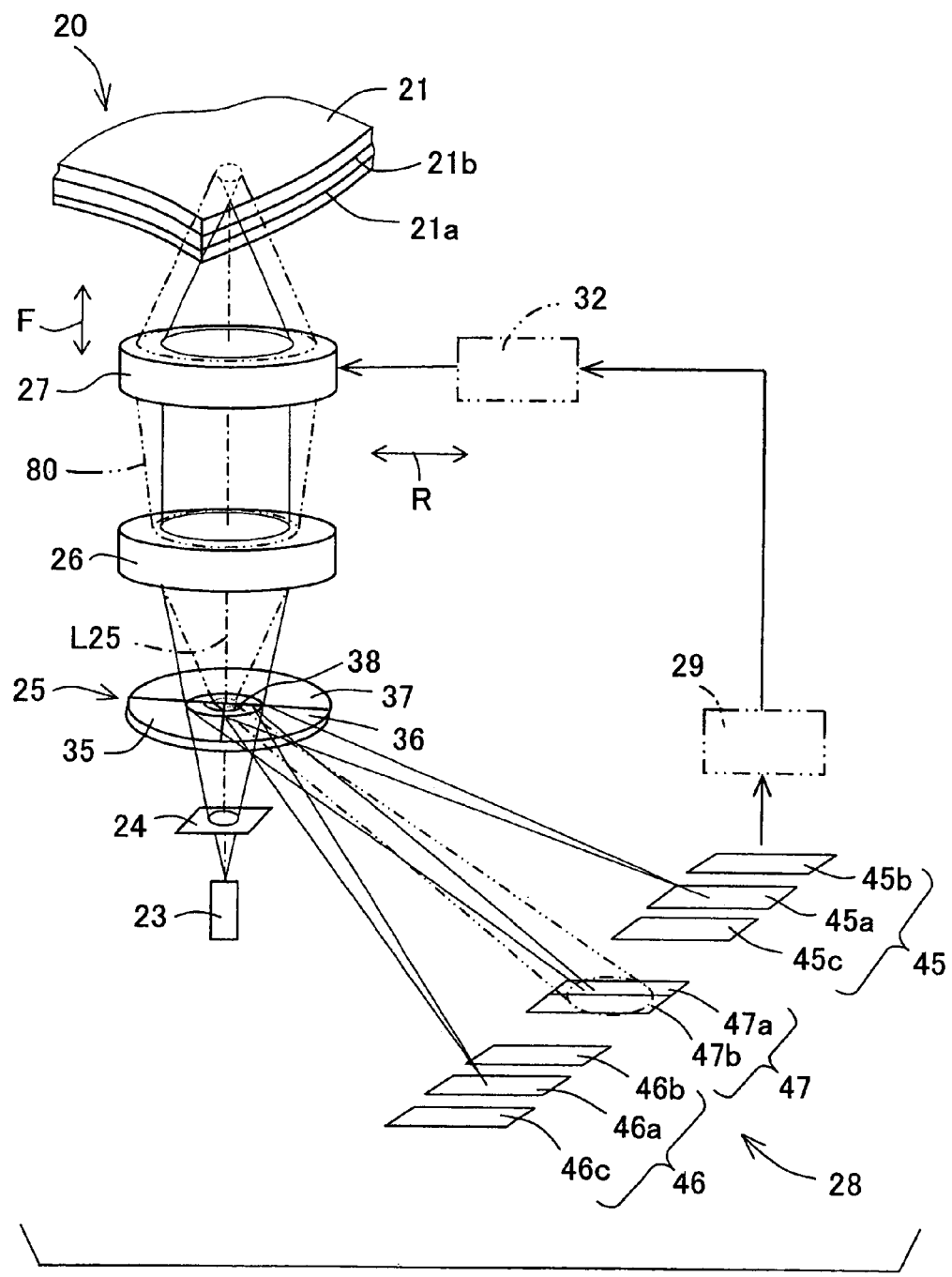
FIG. 1 is a schematic perspective view showing a configuration of an optical pickup apparatus 20 according to a first embodiment of the invention.

Now referring to the drawings, preferred embodiments of the invention are described below.

Figure 2:
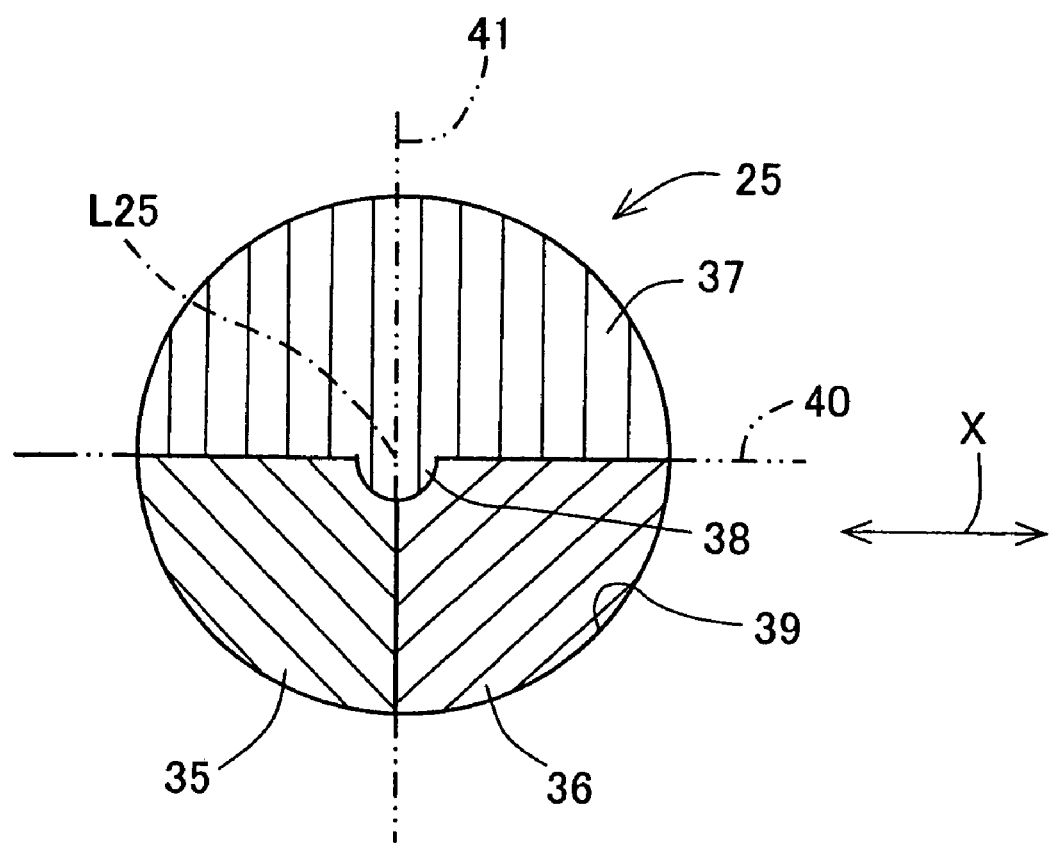
FIG. 2 is a plan view showing a hologram pattern 25.
Figure 3:
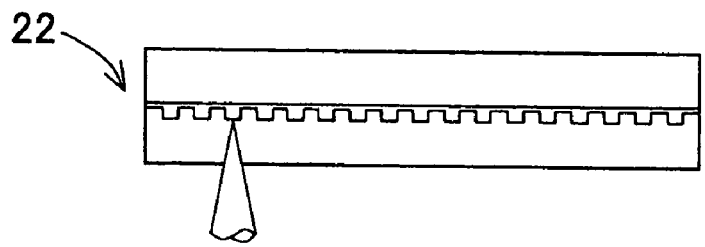
FIG. 3 is a cross sectional view showing a compact disc 22.
Figure 4:
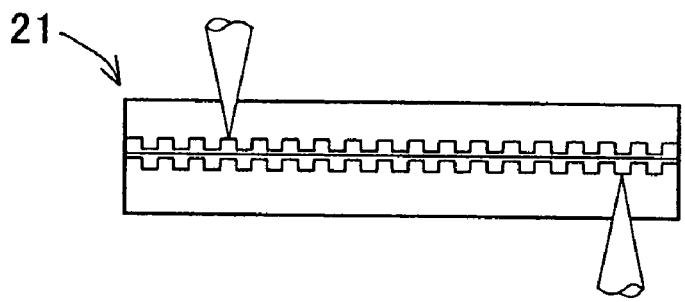
FIG. 4 is a cross sectional view showing another example of a recording medium 21.
Figure 5:
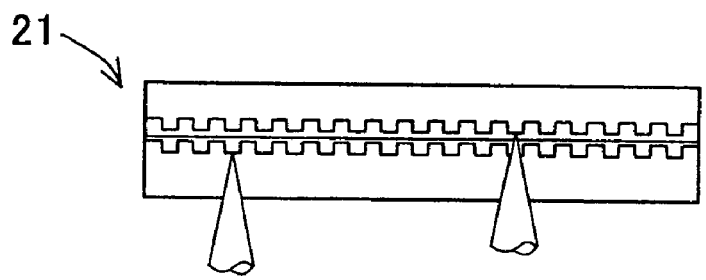
FIG. 5 is a cross sectional view showing still another example of the recording medium 21.
Figure 6:
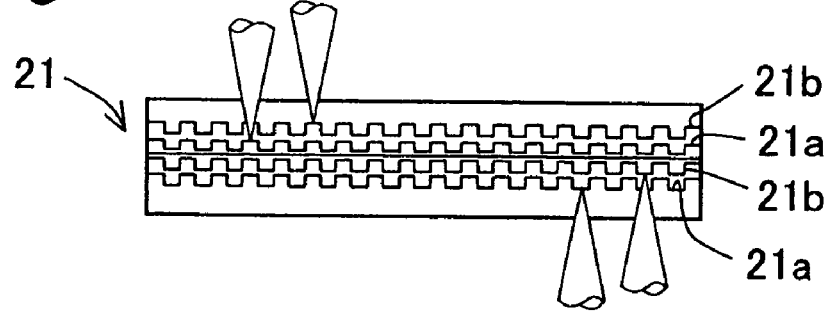
FIG. 6 is a cross sectional view showing still another example of the recording medium 21.

FIG. 1 is a schematic perspective view showing a configuration of an optical pickup apparatus 20 according to a first embodiment of the invention. FIG. 2 is a plan view showing a hologram pattern 25. FIG. 3 is a cross sectional view showing a compact disc 22. FIG. 4 is a cross sectional view showing another example of a recording medium 21. FIG. 5 is a cross sectional view showing still another example of the recording medium 21. FIG. 6 is a cross sectional view showing still another example of the recording medium 21. The optical pickup apparatus 20 is an apparatus for recording and reproducing main information by irradiating the recording medium 21 with light. The main information includes various information such as music information and image information, for instance. On the recording medium 21 is formed a plurality of recording layers for recording and reproducing the main information. The plurality of the recording layers is laminated in a direction parallel to an optical axis of the light which is irradiated onto the recording medium 21.

The recording medium 21 is realized by, for instance, a digital versatile disk (abbreviated as a DVD). The recording medium 21 is formed of the same polycarbonado as the compact disc (abbreviated as a CD) 22 shown in FIG. 3. In a case where the recording medium 21 is a DVD, a CD has a monolayer structure having a thickness of 1.2 mm whereas the recording medium 21 is formed into a multi-layer structure in which two discs having a thickness of 0.6 mm are joined to each other. By reducing the thickness of the disc, a recording surface of the recording layer is disposed so as to be perpendicular to an optical axis of a to-be-irradiated light so that an influence of a tilt angle can be reduced. Further, as shown in FIGS. 3 to 6, it is possible to realize that the recording layer in one disc can be made to be a multi-layer and double-sided by bonding a plurality of discs.

In the recording medium 21 may be formed three or more recording layers. However, for the sake of convenience, two recording layers of a first recording layer 21a and a second recording layer 21b shall be formed. The first recording layer 21a is disposed closer to an objective lens 27 than the second recording layer 21b is. Moreover, the first and second recording layers 21a and 21b are disposed so as to be perpendicular to the optical axis of an emitted light which is irradiated onto the recording medium 21.

The optical pickup apparatus 20 comprises a light source 23, a grating lens 24, the hologram pattern 25, a collimation lens 26, the objective lens 27, light receiving means 28, and control means 29. In the embodiment, the grating lens 24, the hologram element 25, and the collimation lens 26 are disposed so that the optical axis of the emitted light emitted from the light source is an axial line thereof. The light source 23 is means for irradiating the recording medium 21 with light, and realized by a semiconductor laser, for instance. The light source 23 is configured so as to emit light whose central wavelength is within a wavelength range which is preferable for recording and reproducing main information with respect to the multi-layer recording medium 21. The light source 23 emits light which is used with respect to the multi-layer recording medium 21 such as DVD and whose central wavelength is within a wavelength range of 650 nanometer [nm] or more and 660 nanometer [nm] or less.

The emitted light emitted from the light source 23 emits the grating lens 24 which is provided so as to face the light source 23. The grating lens 24 serving as diffracting means is disposed in an optical path over the light source 23 and the objective lens 27, and interposed between the light source 23 and the objective lens 27. The grating lens 24 partly diffracts the emitted light so as to form a main beam 30 and a sub beam 31. The main beam 30 is a main light flux for obtaining the main information recorded on the recording medium 21. The sub beam 31 is a sub light flux for obtaining position information for controlling a light collection position of the main beam 30 in the recording medium 21.

There may be a single sub beam 31 or a plurality of sub beams 31. In the embodiment, the sub beam 31 includes a first sub beam 31a and a second sub beam 31b. Either one of the first and second sub beams 31a and 31b is called as a plus (+) first-order diffraction light or the like. The other one is called as a minus (−) first-order diffraction light or the like. Hereinafter, on an outward path in which the emitted light from the light source 23 is led toward the recording medium 21, when indicating at least any one of the main beam 30 and the first and second sub beams 31a and 31b which are irradiated onto the recording medium 21, it is sometimes merely expressed as "an emitted light".

The emitted light from the grating lens 24 emits the collimation lens 26 via the hologram pattern 25. The collimation lens 26 makes the emitted light from the grating lens 24 be a parallel light, and leads the emitted light to the objective lens 27. The objective lens 27 serving as light collecting means collects the emitted light emitted from the light source 23 onto one recording layer of the recording medium 21. To be specific, the objective lens 27 is provided so as to face the recording medium 21, and collects the emitted light from the collimation lens 26 onto the one recording layer of the recording medium 21.

The objective lens 27 is provided so as to be displaceable in a radial direction R in a movable range including a neutral position. The neutral position is a position that the objective lens is disposed so as to center on the optical axis of the emitted light led to the objective lens 27. The radial direction R which is a variable direction is a direction perpendicular to the optical axis of the emitted light led to the. objective lens. Furthermore, the radial direction R is a direction which is parallel to the first and second recording layers 21a and 21b as well as a direction of scanning a track serving as a recording region. Moreover, the radial direction R is a disc radial direction in a case of a disk-shaped DVD or the like. Furthermore, the objective lens 27 is provided so as to be displaceable in a focus direction F. The focus direction F is a direction which is parallel to the optical axis of the emitted light led to the objective lens 27 and which is perpendicular to the first and second recording layers 21a and 21b.

The objective lens 27 is driven to be displaced in the radial direction R and the focus direction F by an actuator 32 serving as driving means. The actuator 32 drives the objective lens 27 so as to be displaced by a magnetic action on the objective lens 27, for instance. The objective lens 27 changes the light collection position of the emitted light in the recording medium 21 by displacement in the radial direction R due to the actuator 32 so that the emitted light is irradiated onto a desired track. Moreover, the objective lens 27 changes a radiation range of the emitted light in the recording medium 21 by displacement in the focus direction F due to the actuator 32 so that the emitted light is collected in a desired spot size onto a desired recording layer.

The main beam 30 and the first and second sub beams 31a and 31b which are led to the recording medium 21 are reflected by the recording medium 21. Hereinafter, on a backward path in which the emitted light reflected by the recording medium 21 is led to the light receiving means 28, when indicating at least any one of the main beam 30 and the first and second sub beams 31a and 31b which are reflected by the recording medium 21, it is sometimes merely expressed as "a reflected light".

The reflected light reflected by the recording medium 21 is led to the hologram pattern 25 via the objective lens 27. To be specific, the reflected light from the recording medium 21 is led to the hologram pattern 25 via the objective lens 27 and the collimation lens 26. In the embodiment, the hologram pattern 25 is interposed between the light source 23 and the objective lens 27. The hologram pattern 25 has a first TES splitting portion 35, a second TES splitting portion 36, and an FES splitting portion 37.

The first TES splitting portion 35 serving as a first splitting portion and the second TES splitting portion 36 serving as a second splitting portion are disposed in a residual region excluding an axial vicinity portion 38 in the vicinity of a splitting axial line L25 corresponding to the optical axis of the reflected light led to the hologram pattern 25 when the objective lens 27 is located at the neutral position. The axial vicinity portion 38 is formed into a circular shape (refer to FIG. 7) having the splitting axial line L25 as a center.

The first TES splitting portion 35 and the second TES splitting portion 36 are respectively formed into largely sectoral shape. When a residual regional portion excluding the axial vicinity portion 38 from the circular regional portion 39 is split into two regions by a first virtual plane 40, one regional portion of the two regions is further split into two regions by a second virtual plane 41. The first TES splitting portion 35 is one regional portion of the two regions. The circular regional portion 39 is a regional portion having a larger size in the radial direction than that of the axial vicinity portion 38, and having the splitting axial line L25 as a center.

The first virtual plane 40 includes the splitting axial line 25, and is one virtual plane which is parallel to a splitting direction X corresponding to the radial direction R. The second virtual plane 41 includes the splitting axial line L25, and is another virtual plane which is perpendicular to the first virtual plane 40. When the residual regional portion excluding the axial vicinity portion 38 from the circular regional portion 39 is split into two regions by the first virtual plane 40, one regional portion of the two regions is further split into two regions by the second virtual plane 41. The second TES splitting portion 36 is the other regional portion of the two regions. The second TES splitting portion 36 is formed so as to be symmetrical to the first TES splitting portion 35 with respect to the second virtual plane 41.

The FES splitting portion 37 is formed into a largely circular shape. The FES splitting portion 37 is the other regional portion when the residual regional portion excluding the axial vicinity portion 38 from the circular regional portion 39 is split into two regions by the first virtual plane 40. The FES splitting portion 37 is disposed opposite the first and second TES splitting portion 35 and 36 with respect to the first virtual plane 40. In the embodiment, the FES splitting portion 37 is a residual regional portion excluding the first and second TES splitting portions 35 and 36 from the circular region 39, and includes the axial vicinity portion 38. Consequently, the hologram pattern 25 has three splitting portions.

On the first and second TES splitting portions 35 and 36 and the FES splitting portion 37 is respectively formed a plurality of grooves dented in a direction which is parallel to the splitting axial line L25. The grooves formed on the first and second TES splitting portions 35 and 36 and the FES splitting portion 37 have a depth, a distance, an extending direction and the like thereof set based on a diffraction efficiency of the hologram pattern 25 and a disposing position of the light receiving means 28. Moreover, in the hologram pattern 25, various configurations such as the depth and distance of the grooves may be freely changed in accordance with a configuration of an apparatus.

On the first TES splitting portion 35 is formed a plurality of the grooves so as to be inclined at a predetermined angle with respect to the first virtual plane 40 and the second virtual plane 41, for instance. On the second TES splitting portion 36 is formed a plurality of the grooves so as to be symmetrical to the first TES splitting portion 35 with respect to the second virtual plane 41. On the FES splitting portion 37 is formed a plurality of the grooves so as to extend in a state of being substantially perpendicular to the first virtual plane 40, for instance. The substantial perpendicularity includes perpendicularity. Moreover, in the embodiment, the hologram pattern 25 serves also as a splitter.

The reflected light which has been led from the recording medium 21 and emitted the hologram pattern 25 is split by being diffracted in the respective first and second TES splitting portions 35 and 36 and FES splitting portion 37, and is led to the light receiving means 28. The light receiving means 28 receives the reflected light from the recording medium 21. The light receiving means 28 has a first TES light receiving portion 45, a second TES light receiving portion 46, and an FES light receiving portion 47. The first TES light receiving portion 45 is a first light receiving portion for obtaining track position information and shift information. The second TES light receiving portion 46 is a second light receiving portion for obtaining the track position information and the shift information. The FES light receiving portion 47 is a third receiving portion for obtaining focus position information.

The track position information is information of the light collection position of the emitted light with respect to the radial direction R which is parallel to the first and second recording layers 21a and 21b, as well as information regarding a position of the emitted light with respect to a pit of the track. The shift information is information concerning a shift of the objective lens 27 with respect to the neutral position. The focus position information is information of the light collection position of the emitted light with respect to the focus direction F which is perpendicular to the first and second recording layers 21a and 21b.

The reflected light which has emitted the hologram pattern 25 is split in the respective splitting portions 35 to 37. The first TES splitting portion 35 leads the reflected light to the first TES light receiving portion 45, and the second TES splitting portion 36 leads the reflected light to the second TES light receiving portion 46, and then the FES splitting portion 37 leads the reflected light to the FES light receiving portion 47. The first TES receiving portion 45 receives, among the reflected lights from the recording medium 21, the reflected light led by the first TES splitting portion 35. The second TES light receiving portion 46 receives, among the reflected lights from the recording medium 21, the reflected light led by the second TES splitting portion 36. The FES light receiving portion 47 receives, among the reflected lights from the recording medium 21, the reflected light led by the FES splitting portion 37.

The first and second TES light receiving portions 45 and 46 and the FES light receiving portion 47 have one or a plurality of light receiving elements. The light receiving element is realized by, for instance, a photodiode. The first TES light receiving portion 45 has a main light receiving element 45a, and first and second sub light receiving elements 45b and 45c serving as light receiving elements. The main light receiving portion 45a of the first TES light receiving portion 45 receives, among the reflected lights from the first TES splitting portion 35, the maim beam 30. The first sub light receiving element 45b of the first TES light receiving portion 45 receives, among the reflected lights from the first TES splitting portion 35, the first sub beam 31a. The second sub light receiving element 45c of the first TES light receiving portion 45 receives, among the reflected light from the first TES splitting portion 35, the second sub beam 31b.

The second TES light receiving portion 46 has the main light receiving element 46a and the first and second sub light receiving elements 46a and 46b serving as light receiving elements. The main light receiving element 46a of the second TES light receiving portion 46 receives, among the reflected lights from the second TES light splitting portion 36, the main beam 30. The first sub light receiving element 46b of the second TES light receiving portion 46 receives, among the reflected light from the second TES splitting portion 36, the first sub beam 31a. The second sub light receiving element 46c of the second TES light receiving portion 46 receives, among the reflected lights from the second TES splitting portion 36, the second sub beam 31b.

The FES light receiving portion 47 has a plurality of FES light receiving elements, in the embodiment two FES light receiving elements 47a and 47b. The FES light receiving portion 47 receives the reflected light from the FES splitting portion 37 by at least either one of the two FES light receiving elements 47a and 47b.

The light receiving means 28 gives an output value which corresponds to a light intensity of the reflected light which is respective light receiving results due to the first and second TES light receiving portions 45 and 46 and the FES light receiving portion 47, to the control means 29 as an electronic signal. The control means 29 obtains the track position information and the shift information by the respective light receiving results due to the light receiving means 28. To be specific, the control means 29 obtains the track position information and the shift information by the respective light receiving results due to the first and second TES light receiving portions 45 and 46. The control means 29 controls the position of the objective lens 27 in the radial direction R based on the obtained track information and shift information.

Moreover, the control means 29 obtains the focus position information by the respective light receiving results due to the light receiving means 28. To be specific, the control means 29 obtains the focus position information by the result of the light reception by the FES light receiving portion 47. The control means 29 controls the position of the objective lens 27 in the focus direction F based on the obtained focus position information. The control means 29 thus controls the position of the objective lens 27 and thereby the light collection position of the emitted light in the recording medium 21 is controlled. The control means 29 is realized by, for instance, a central processing unit (abbreviated as CPU).

Figure 7:
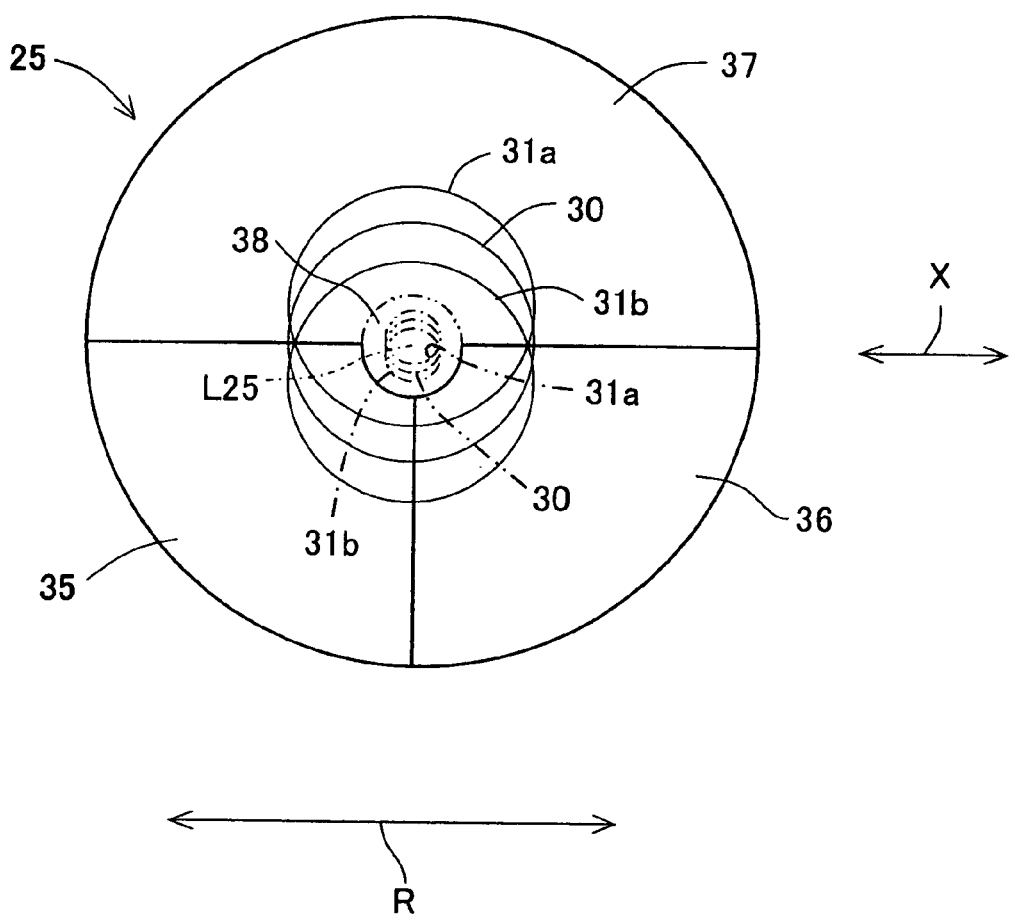
FIG. 7 is a plan view showing the hologram pattern 25 onto which reflected lights from first and second recording layers 21a and 21b are irradiated when an objective lens 27 is located at a neutral position.
Figure 8:
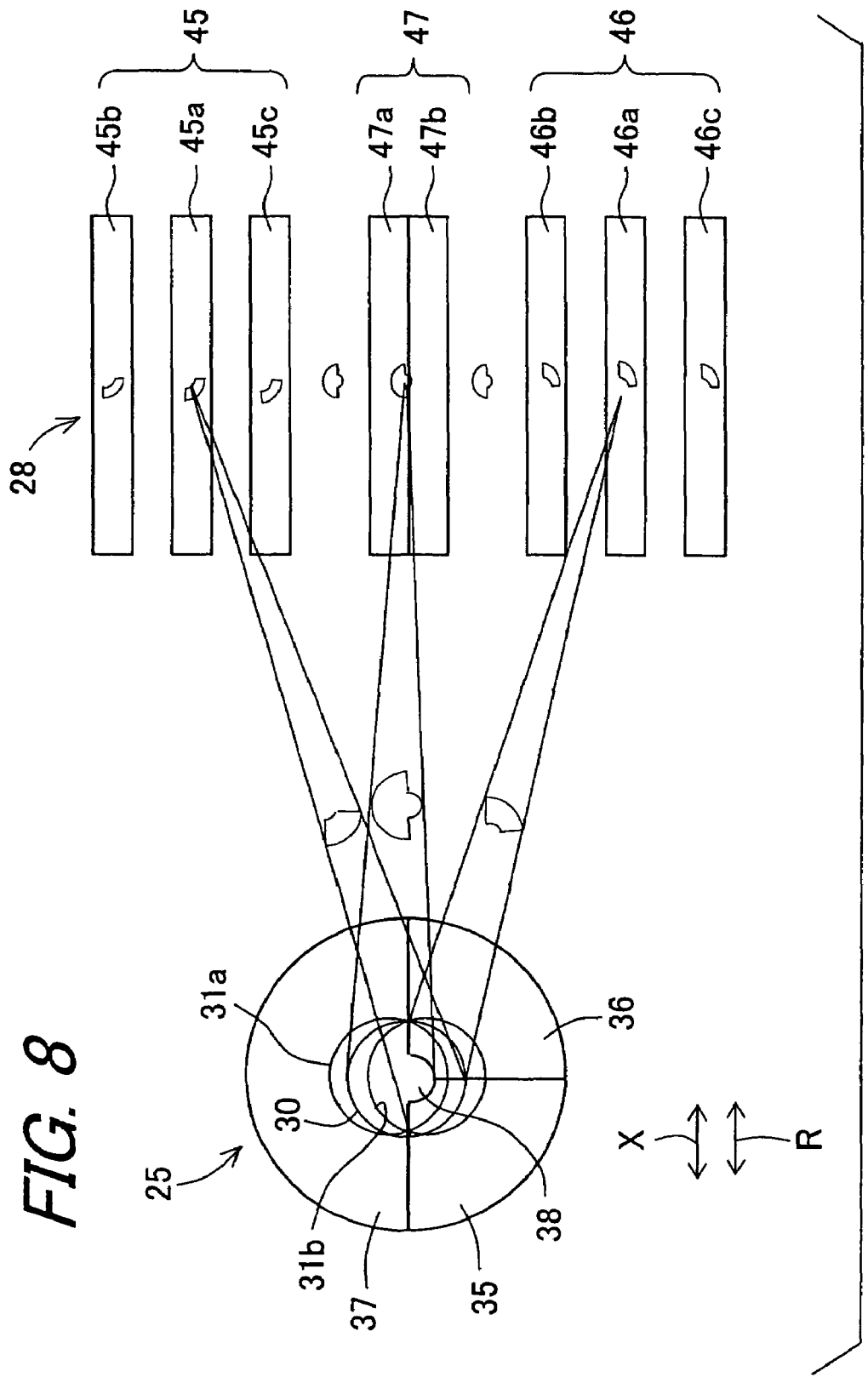
FIG. 8 is a plan view showing the hologram pattern 25 onto which the reflected light from the first recording layer 21a is irradiated when the objective lens 27 is located at the neutral position.
Figure 9:
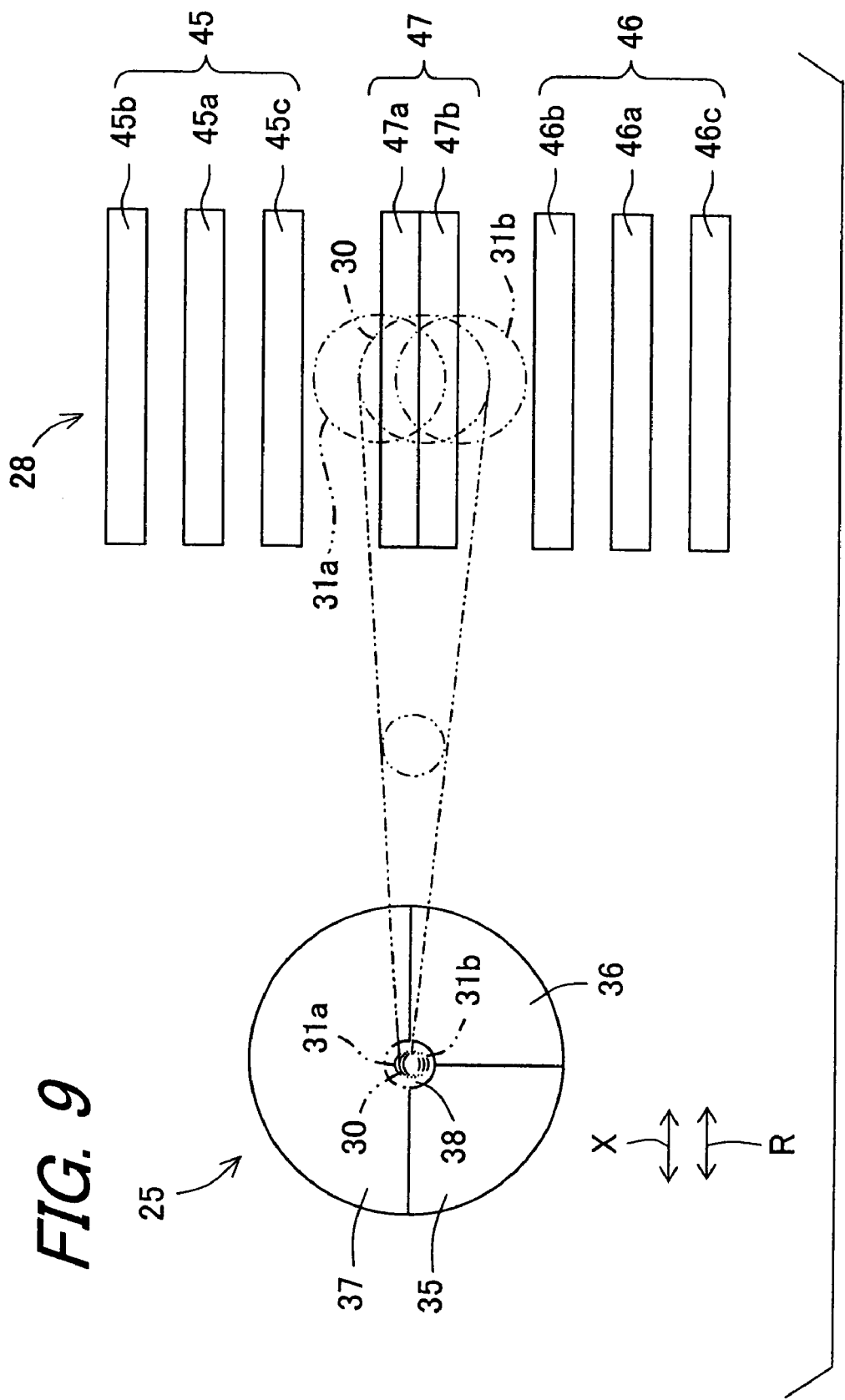
FIG. 9 is a plan view showing the hologram pattern 25 onto which the reflected light from the second recording layer 21b is irradiated when the objective lens 27 is located at the neutral position.

FIG. 7 is a plan view showing the hologram pattern 25 onto which the reflected lights from first and second recording layers 21a and 21b are irradiated when the objective lens 27 is located at the neutral position. FIG. 8 is a plan view showing the hologram pattern 25 onto which the reflected light from the first recording layer 21a is irradiated when the objective lens 27 is located at the neutral position. FIG. 9 is a plan view showing the hologram pattern 25 onto which the reflected light from the second recording layer 21b is irradiated when the objective lens 27 is located at the neutral position. When reproducing the main information, the emitted light from the light source 23 is irradiated in a collected state onto either one of the first and second recording layers 21a and 21b of the recording medium 21. The main information is obtained based on the result of the light reception by the main light receiving element 45a of the first TES light receiving portion 45, the result of the light reception by the main light receiving element 46a of the second TES light receiving portion 46, and the result of the light reception by the one light receiving element 47a of the FES light receiving portion 47.

In a case where the emitted light from the light source 23 is irradiated onto, for instance, the first recording layer 21a, in order to reproduce the main information, the position of the objective lens 27 with respect to the recording medium 21 is controlled. To be specific, the displacement of the objective lens 27 in the radial direction R with respect to the recording medium 27 is controlled by a track servo based on the track position information. By a focus servo based on the focus position information, the displacement in the focus direction F with respect to the recording medium 27 is controlled.

The track position information is obtained by the control means 29 in accordance with, for instance, a differential phase detection (abbreviated as DPD) method based on the respective light receiving results due to the first and second TES light receiving portions 45 and 46. In the DPD method, a radial error signal indicating the track position information is detected by the respective light receiving results due to the first and second TES light receiving portions 45 and 46. The radial error signal is detected by the differential phase detection between the light intensity of the main beam 30 due to the main light receiving element 45a of the first TES light receiving portion 45 and the light intensity of the main beam 30 due to the main light receiving element 46a of the second TES light receiving portion 46. Detecting means (not shown) for detecting the radial error signal is provided, for instance, on the control means 29. By so doing, the track position information is obtained by the control means 29.

Moreover, the focus position information is obtained by the control means 29 based on the result of the light reception by the FES light receiving portion 47 in accordance with a knife-edge method. In the knife-edge method, a focus error signal indicating the focus position information is detected by the result of the light reception by the FES light receiving portion 47. The focus error signal is detected by a difference of the output values respectively outputted by the respective light receiving elements 47a and 47b of the FES light receiving portion 47 based on the light intensity of a received light. Detecting means for detecting the focus error signal is provided, for instance, on the control means 29. By so doing, the focus position information is obtained by the control means 29.

Furthermore, when controlling the displacement of the objective lens 27 by the track servo, a lens position signal indicating the shift information is detected. The optical pickup apparatus 20 is driven to be displaced in the radial direction R by feeding means (not shown) so that the objective lens 27 is driven to be displaced within the movable range by, for instance, disposing the objective lens 27 at the neutral position based on the lens position signal. In a case where the lens position signal cannot be correctly detected, an amount of the displacement of the objective lens 27 in the radial direction R from the neutral position becomes too large, with the result that a signal obtained by the light receiving means 28 contains a noise and gets deteriorated. Further in this case, the control means 29 controls so that the objective lens 27 is displaced beyond the movable range, for instance, and thereby causing a malfunction. By so doing, an excessive current is given to the actuator 32, for instance, and the actuator 32 gets broken. Accordingly, reliability of the apparatus is lowered. Consequently, it is necessary to reliably detect a correct lens position signal.

The lens position signal is detected by use of the main beam 30 and the sub beam 31 which are obtained by the grating lens 24. The signal based on the main beam 30 includes two main signals S1 and S2. The one main signal S1 is a signal indicating an output value outputted by the main light receiving element 45a of the first TES light receiving portion 45 in response to a light intensity of the received main beam 30. The other main signal S2 is a signal indicating an output value outputted by the main light receiving element 46a of the second TES light receiving portion 46 in response to a light intensity of the received main beam 31.

The signal based on the first sub beam 31a of the sub beam 31 includes two first sub signals S3 and S4. The one first sub signal S4 is a signal indicating an output value outputted by the first sub light receiving element 45b of the first TES light receiving portion 45 in response to a light intensity of the received first sub beam 31a. The other first sub signal S4 is a signal indicating an output value outputted by the first sub light receiving element 46b of the second TES light receiving portion 46 in response to a light intensity of the received first sub beam 31a.

The signal based on the second sub beam 31b of the sub beam 31 includes two second sub signals S5 and S6. The one second sub signal S5 is a signal indicating an output value outputted by the second sub light receiving element 45c of the first TES light receiving portion 45 in response to a light intensity of the received second sub beam 31b. The other second sub signal S6 is a signal indicating an output value outputted by the second sub light receiving element 46c of the second TES light receiving portion 46 in response to a light intensity of the received second sub beam 31b.

The amount of the displacement of the objective lens 27 in the radial direction R from the neutral position can be obtained based on a difference between the output value in response to the light intensity of the reflected light from the first TES splitting portion 35, and the output value in response to the light intensity of the reflected light from the second TES splitting portion 36. In the radial direction R, the amount of the displacement of the objective lens 27 from the neutral position is indicated by the following formula (1) in a case where reference numerals put on the to be detected respective signals S1 to S6 are made to respond to the output value indicated by the respective signals S1 to S2.

$$SLP = (S1-S2) + \{(S3+S5) - (S4+S6)\} \quad (1)$$

In the formula (1), the output value indicated by a lens position signal SLP on left-hand side is obtained by sum of a value indicated by a main push pull signal in a first term and a value indicated by a sub push pull signal in a second term on right-hand side. The main push pull signal is a signal indicating a difference between the output value indicated by the main signal S1 due to the main light receiving element 45a of the first TES light receiving portion 45 and the output value indicated by the main signal S2 due to the main light receiving element 46b of the second TES light receiving portion 46. The sub push pull signal is a signal indicating a value obtained by splitting a sum of the output values indicated by the respective first and second sub signals S3 and S5 in the first TES light receiving portion 45 by a sum of the output value indicated by the respective first and second sub signals s4 and s6 in the second TES light receiving portion 46.

The respective signals S1 to S6 outputted by the first and second TES light receiving portions 45 and 46 and the FES light receiving portion 47 contain an alternate current (AC) component generated when the objective lens 27 crosses the track, and a direct current (DC) component attributable to the light intensity of the reflected light. The main push pull signal and the sub push pull signal need to be removed since the AC components are left respectively in the values indicated by the main push pull signal and the sub push pull signal. However, differential phases are deviated by 180 degrees and therefore, unnecessary AC components are removed by summing as in the formula (1). By thus using main beam 30 and the sub beam 31, the control means 29 obtains an output value in response to the light intensity indicated by only the DC component by a calculation based on the formula (1), and takes out an amount of displacement of the obtained objective lens 27 from the neutral position as the lens position signal SLP.

Moreover, the radial error signal indicating the track position information may be detected based on the respective light receiving results of the first and second light receiving portions 45 and 46 instead of the above-described DPD method, in accordance with, for instance, a differential push pull (abbreviated as DPP) method. In the DPP method, the radial error signal is detected by the respective light receiving results due to the first and second TES light receiving portions 45 and 46. In the DPP method, an output value Stes indicated by the radial error signal is indicated by, for instance, the following formula (2).

$$Stes = (S1-S2) - k\{(S3-S4) + (S5-S6)\} \quad (2)$$

In the formula (2), a coefficient k is for compensating a difference between the light intensities of the main beam 30 and the sub beam 31. In a case where an intensity ratio is such that the main beam: the first sub beam: the second sub beam=k1:k2:k2, the coefficient k is obtained by k1/(2×k2).

When the main information recorded on the first recording layer 21a is reproduced, the emitted light from the light source 23, to be specific, the main beam 30 and the sub beam 31 is irradiated in a collected state onto the first recording layer 21a which is one recording layer. The main beam 30 and the sub beam 31 which have been irradiated onto the first recording layer 21a have a part thereof reflected by the first recording layer 21a. and a part of the remnant transmitted by the first recording layer 21a and led to the second recording layer 21b which is the other recording layers. The reflected light reflected by the first recording layer 21a is led to the hologram pattern 25 via the objective lens 27 and the collimation lens 26.

In a case where the light collection position of the emitted light is located on the first recording layer 21a which is one recording layer, the reflected light reflected by the second recording layer 21b which is the other recording layers is irradiated onto the hologram pattern 25 in a smaller radiation range than the reflected light reflected by the first recording layer 21a. To be specific, the main beam 30 and the sub beam 31 led to the second recording layer 21b are reflected at a position which is further away than a focal length of the objective lens 21 since the second recording layer 21b is located further away from the objective lens 27 than the first recording layer 9a. By so doing, the main beam 30 and the sub beam 31 from the second recording layer 21b are led to the hologram pattern 25, for instance, as shown by a virtual line in FIG. 1 in a state of being more focused than the first recording layer 21a by the objective lens 27 and the collimation lens 26.

When the objective lens 27 is located at the neutral position, the reflected light from the first recording layer 21a enters the hologram pattern 25 in such a manner that an optical axis of the main beam 30 corresponds to the splitting axial line L25. At the time, the reflected light from the first recording layer 21a enters the first and second TES splitting portions 35 and 36 and the FES splitting portion 37. Moreover, at the time, the first and second sub beams 31 from the first recording layer 21a enter the hologram pattern 25 in such a manner that optical axes thereof are perpendicular to the first virtual plane and orthogonal to one virtual line which is orthogonal to the splitting axial line L25. The reflected light from the first recording layer 21a, which has entered the hologram pattern 25 is split in the respective first and second TES splitting portions 35 and 36 and FES splitting portion 37, and then led to the light receiving means 28.

Moreover, when the objective lens 27 is located at the neutral position, the main beam 30 from the second recording layer 21b enters in such a manner that an optical axis thereof corresponds to the splitting axial line L25. The main beam 30 and the sub beam 31 from the second recording layer 21b enter the axial vicinity portion 38 without entering the first and second TES splitting portions 35 and 36. Since the axial vicinity portion 38 is included in the FES splitting portion 37, the reflected light from the second recording layer 21b is led to the FES light receiving portion 37 by the axial vicinity portion 38.

Figure 10:
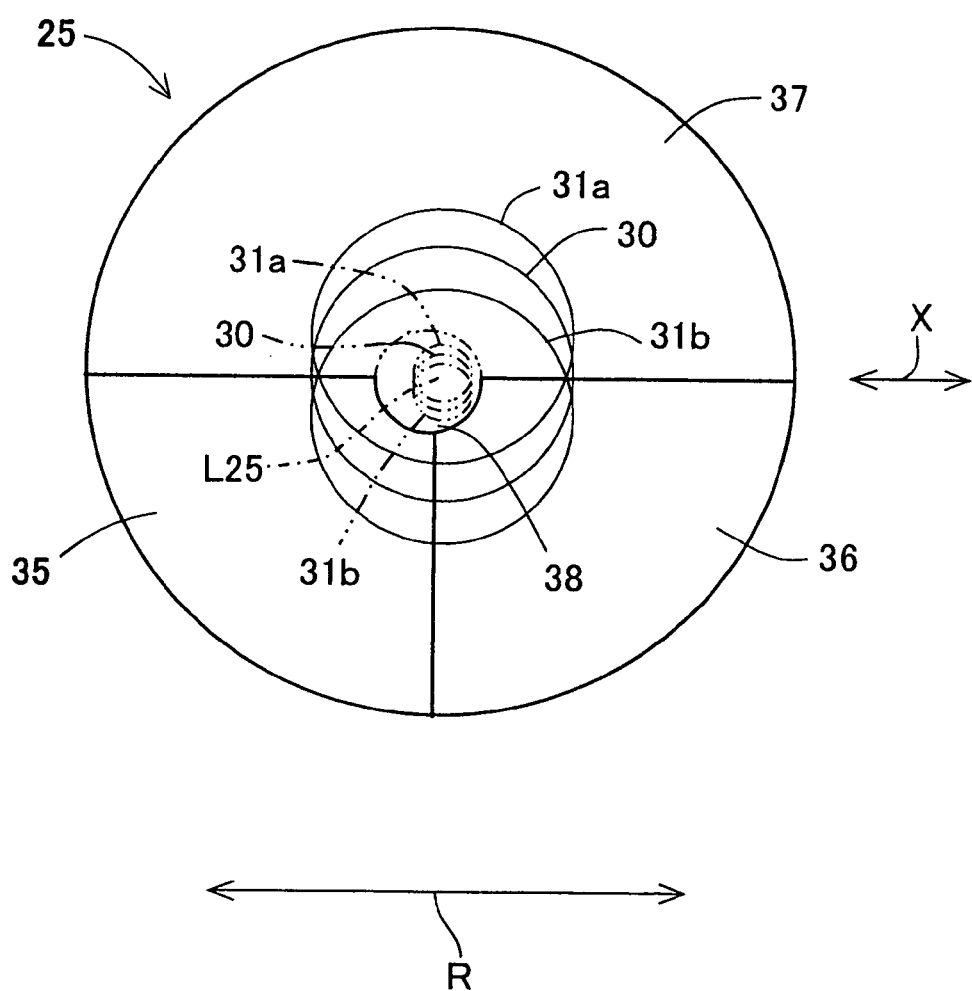
FIG. 10 is a plan view showing the hologram pattern 25 onto which the reflected lights from the first and second recording layers 21a and 21b are irradiated when the objective lens 27 is located at a position which is shifted in one direction of a radial direction A from the neutral position.
Figure 11:
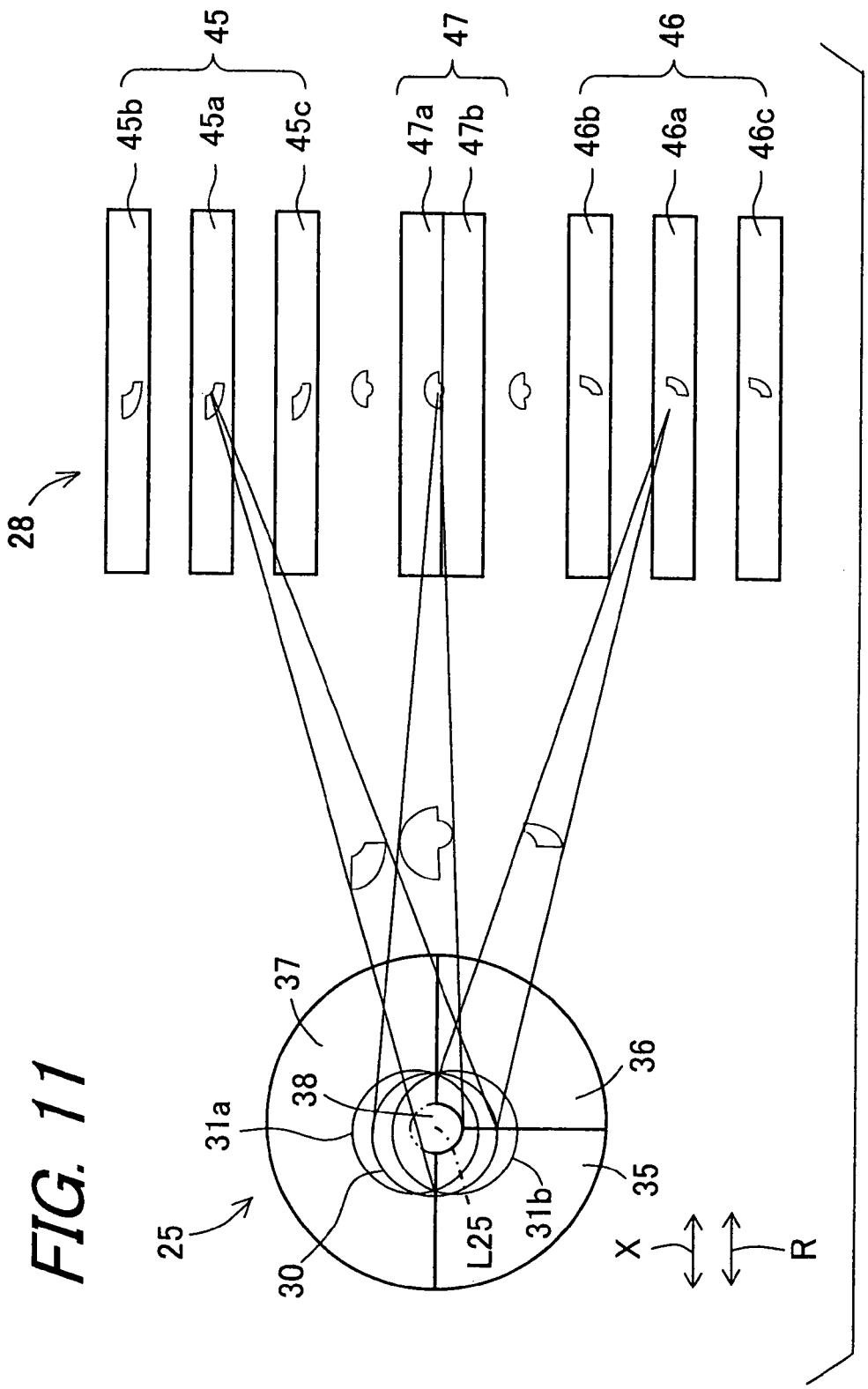
FIG. 11 is a plan view showing the hologram pattern 25 onto which the reflected light from the first recording layer 21a is irradiated when the objective lens 27 is located at a position which is shifted in one direction of the radial direction A from the neutral position.
Figure 12:
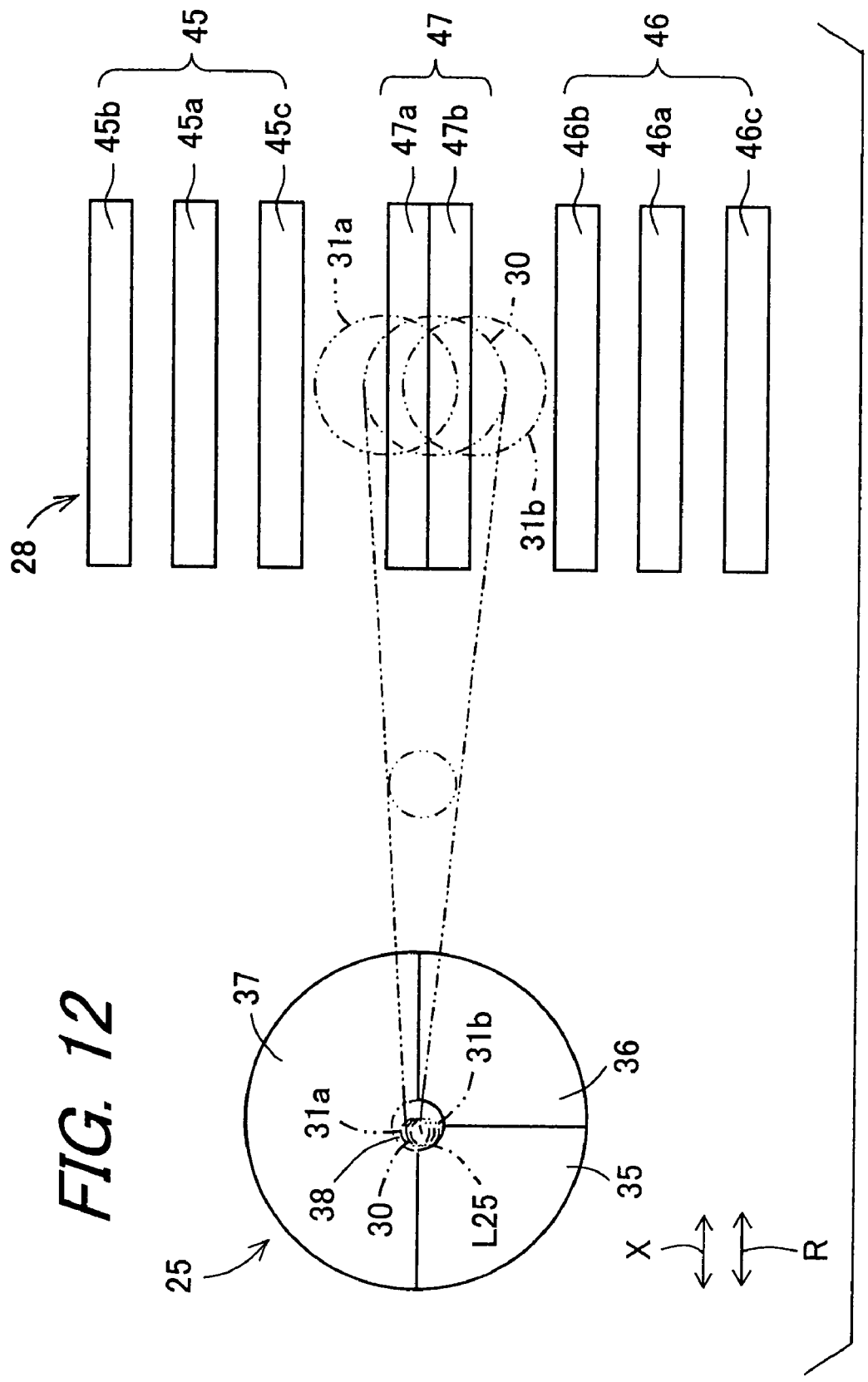
FIG. 12 is a plan view showing the hologram pattern 25 onto which the reflected light from the second recording layer 21b is irradiated when the objective lens 27 is located at the position which is shifted in one direction of the radial direction A from the neutral position.
Figure 13:
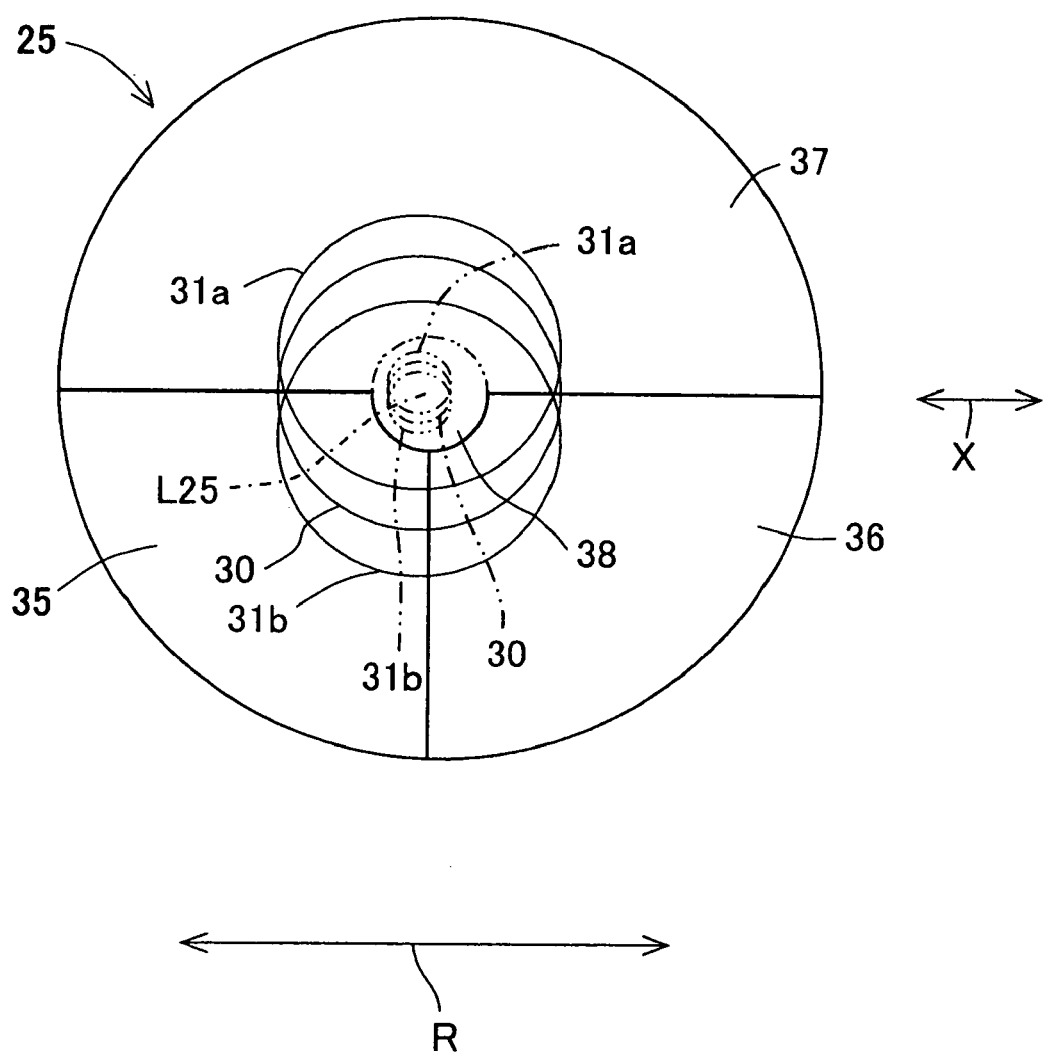
FIG. 13 is a plan view showing the hologram pattern 25 onto which the reflected lights from the first and second recording layers 21a and 21b are irradiated when the objective lens 27 is located at a position which is shifted in the other direction of the radial direction A from the neutral position.
Figure 14:
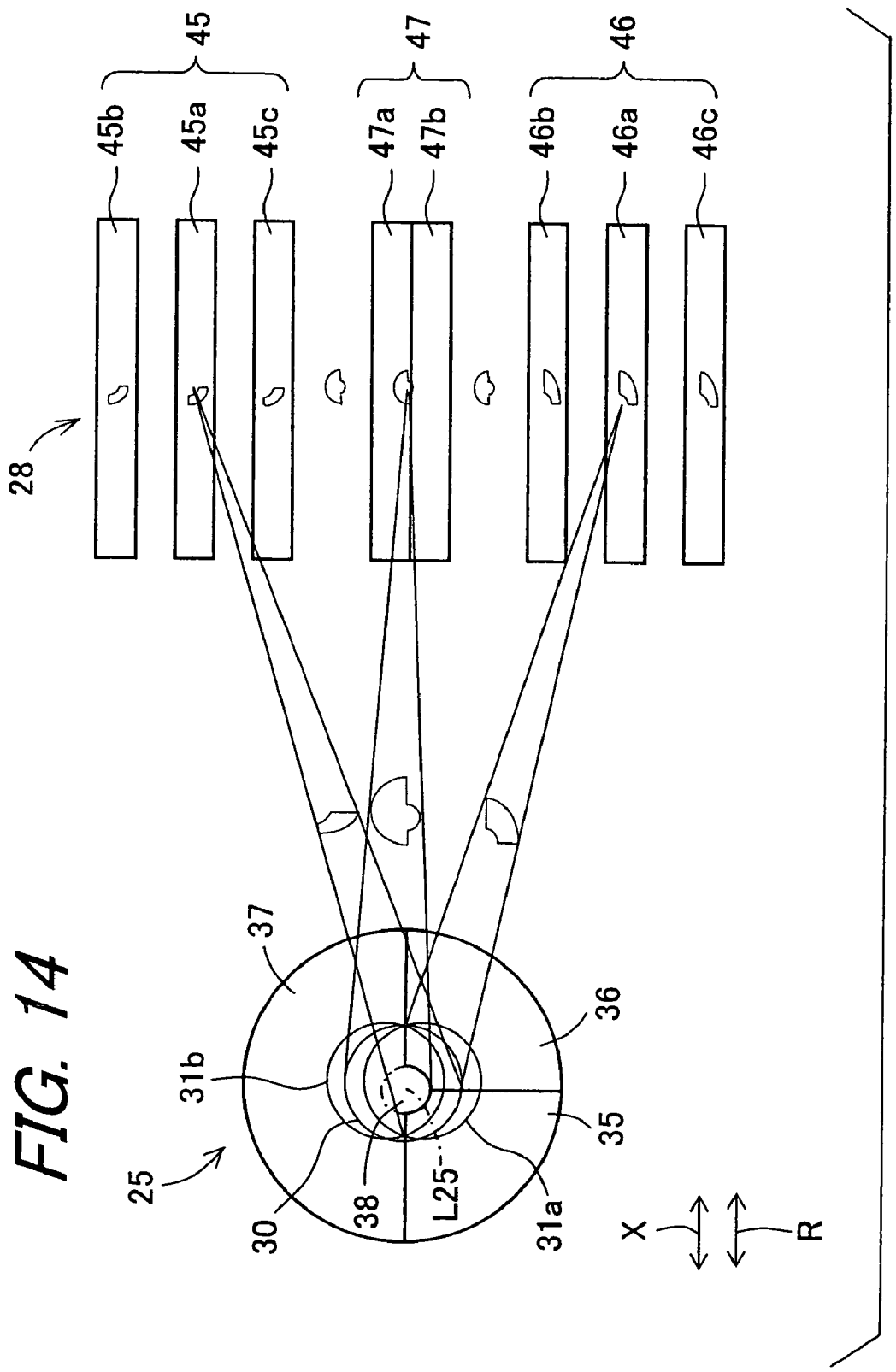
FIG. 14 is a plan view showing the hologram pattern 25 onto which the reflected light from the first recording layer 21a is irradiated when the objective lens 27 is located at the position which is shifted in the other direction of the radial direction A from the neutral position.
Figure 15:
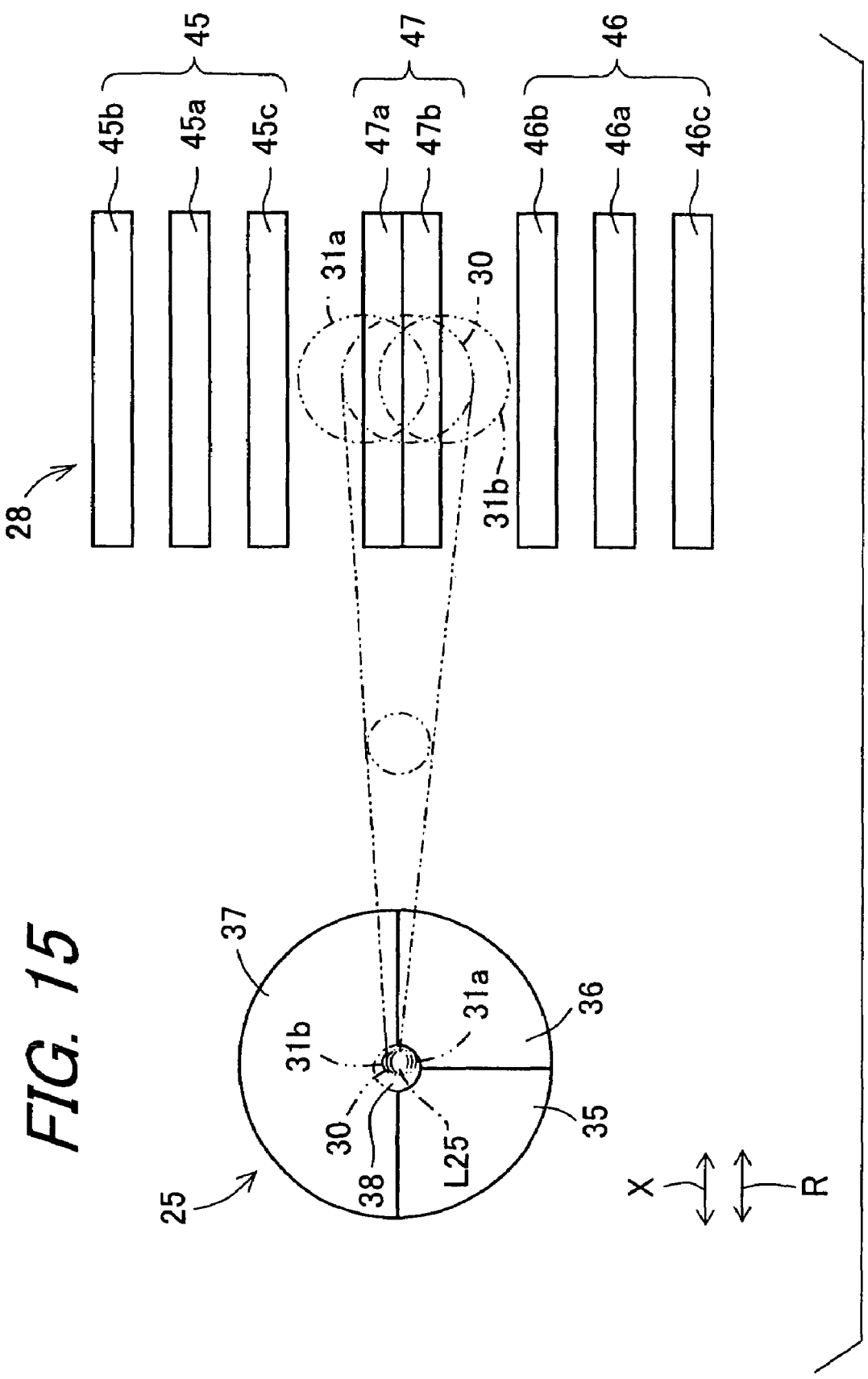
FIG. 15 is a plan view showing the hologram pattern 25 onto which the reflected light from the second recording layer 21b is irradiated when the objective lens 27 is located at the position which is shifted in the other direction of the radial direction A from the neutral position.

FIG. 10 is a plan view showing the hologram pattern 25 onto which the reflected lights from the first and second recording layers 21a and 21b are irradiated when the objective lens 27 is located at a position which is shifted in one direction of a radial direction A from the neutral position. FIG. 11 is a plan view showing the hologram pattern 25 onto which the reflected light from the first recording layer 21a is irradiated when the objective lens 27 is located at a position which is shifted in one direction of the radial direction A from the neutral position. FIG. 12 is a plan view showing the hologram pattern 25 onto which the reflected light from the second recording layer 21b is irradiated when the objective lens 27 is located at the position which is shifted in one direction of the radial direction A from the neutral position. FIG. 13 is a plan view showing the hologram pattern 25 onto which the reflected lights from the first and second recording layers 21a and 21b are irradiated when the objective lens 27 is located at a position which is shifted in the other direction of the radial direction A from the neutral position. FIG. 14 is a plan view showing the hologram pattern 25 onto which the reflected light from the first recording layer 21a is irradiated when the objective lens 27 is located at the position which is shifted in the other direction of the radial direction A from the neutral position. FIG. 15 is a plan view showing the hologram pattern 25 onto which the reflected light from the second recording layer 21b is irradiated when the objective lens 27 is located at the position which is shifted in the other direction of the radial direction A from the neutral position. The objective lens 27 is driven to be displaced to the one direction or the other direction of the radial direction A from the neutral position in order to follow an eccentricity of the recording medium 21.

When the objective lens 27 is driven to be displaced, the reflected light from first recoding layer 21a has an irradiated position thereof in the hologram 25 changing to the one direction or the other direction of the radial direction R as shown in FIGS. 10, 11, 13, and 14. To be specific, when the objective lens 27 is driven to be displace in the radial direction R, the irradiated position of the reflected light led to the hologram patter 25 changes to the splitting direction X in the hologram pattern 25 in such a manner that an optical axis thereof is included in the first virtual plane 40. In the hologram pattern 25, the axial vicinity portion 38 is formed in a region including a mobilization regional portion at the time that the radiation range of the reflected light from the second recording layer 21b is displace along with the displacement of the objective lens 27, in a case where the radiation range of the reflected light from the second recording layer 21b is smaller than the radiation range of the reflected light from the first recording layer 21a. The axial vicinity portion 38 has a size in a radial direction set to the extent that the reflected light from the second recording layer 21b does not enter the first and second TES splitting units 35 and 36 even when the objective lens 27 is driven to be displaced in the radial direction R.

Since the axial vicinity portion 38 is thus configured, the reflected light from the recording layer 21b has a radiation range thereof displaced within a region in which the axial vicinity portion 38 is formed, to the splitting direction X even when the objective lens 27 is driven to be displaced in the radial direction R within the movable range. By so doing, the reflected light from the second recording layer 21b reliably enters the axial vicinity portion 38, and is prevented from entering only one of the first and second TES splitting portions 35 and 36. This makes it possible to remove the offset in the lens position signal SLP, caused by entering into only one of the first and second TES splitting portions 35 and 36. Furthermore, a relation between the output value indicated by the lens position signal SLP and the position of the objective lens 27 in the radial direction R can be shown by a graph having linearity. Consequently, the shift of the objective lens 27 in the radial direction R from the neutral position can be correctly obtained.

Further, the reflected light from the second recording layer 21b is prevented from entering the first and second TES splitting portions 35 and 36 and therefore, the offset is prevented from being caused in the sub push pull signal, and a correct radial error signal can be detected. Since the correct lens position signal SLP and radial error signal are thus detected, the correct shift information and tracking position information are reliably obtained. This makes it possible to control the objective lens 27 with high accuracy based on the shift information and the tracking position information, and thereby the position of the emitted light in the recording medium 21 can be controlled with high accuracy. Consequently, it is possible to realize a stable track servo.

Moreover, the reflected light from the second recording layer 21b is led to the FES light receiving portion 47 by the FES splitting portion 37, but removed when the focus error signal is detected and therefore, the correct focus error signal can be reliably detected. Consequently, in addition to the track servo, a stable focus servo can be also realized.

Figure 16:
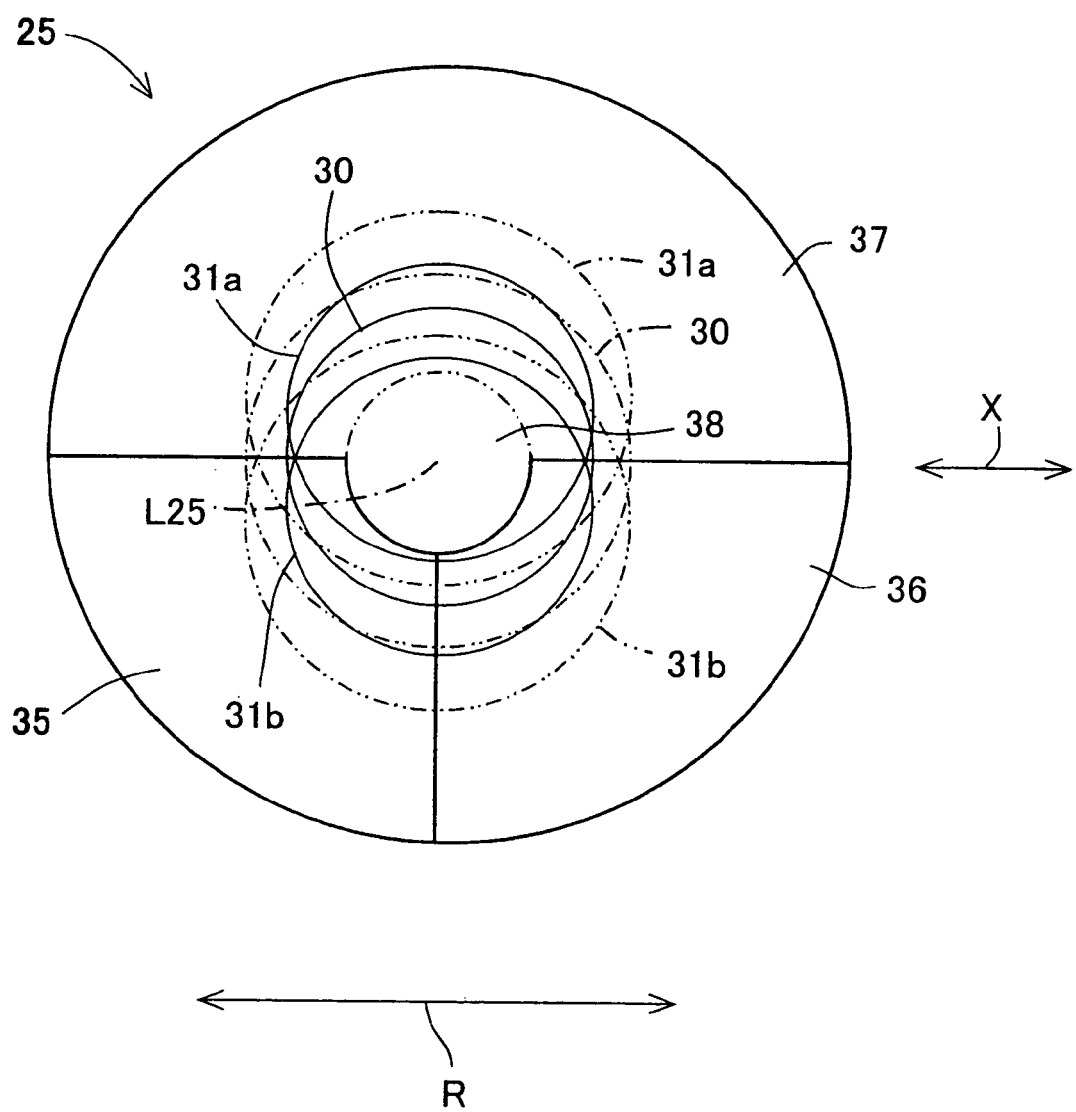
FIG. 16 is a plan view showing the hologram pattern 25 onto which the reflected lights from the first and second recording layers 21a and 21b are irradiated when an emitted light is collected onto the second recording layer 21b.

FIG. 16 is a plan view showing the hologram pattern 25 onto which the reflected lights from the first and second recording layers 21a and 21b are irradiated when the emitted light is collected onto the second recording layer 21b. When reproducing the main information recorded on the second recording layer 21b, the emitted light from the light source 23 is irradiated onto the second recording layer 21b in a collected state by the objective lens 27. In addition to the reflected light reflected by the second recording layer 21b, the reflected light reflected by the first recording layer 21a enters the hologram pattern 25. In the hologram pattern 25, the reflected light from the first recording layer 21a is irradiated in a larger radiation range than the second recording layer 21b. In this case, the reflected light from the first recording layer 21a always enters both the first and second TES splitting portions 35 and 36 even when the objective lens 27 is driven to be displaced in the radial direction R. This makes it possible to remove the offset caused by entering only one of the first and second splitting portions 35 and 36. Since the offset is removed, the relation between the output value indicated by the lens position signal SLP and the position of the objective lens 27 in the radial direction R can be shown by the graph having linearity. Consequently, the correct lens position signal can be detected, and the stable track servo can be realized.

Figure 17:
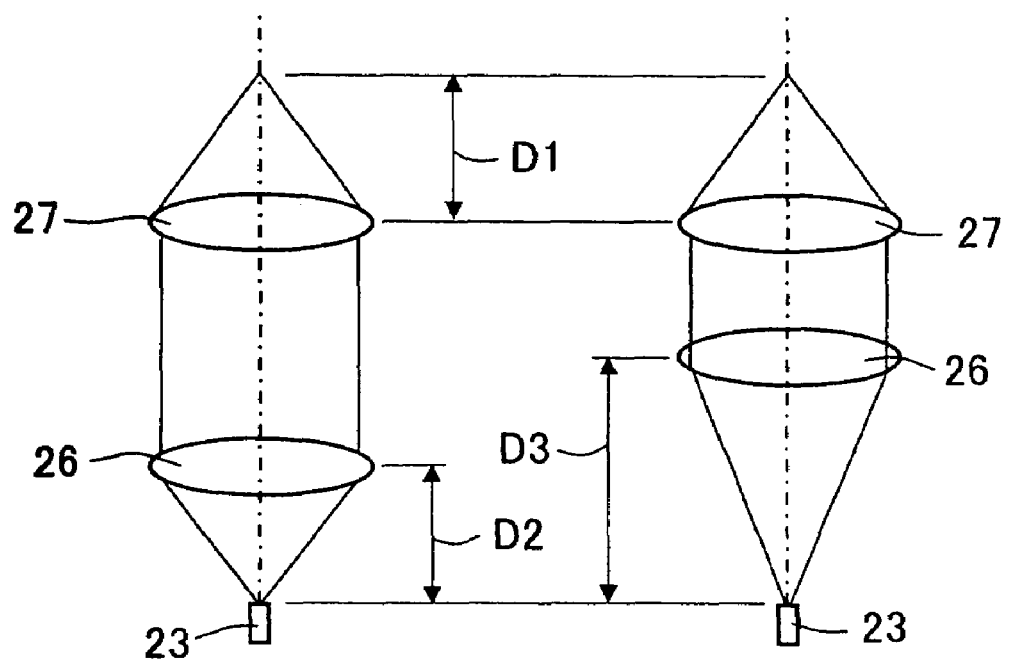
FIG. 17 is a view for explaining a lens magnification.

FIG. 17 is a view for explaining a lens magnification. In order to make the reflected light reflected by the other recording layers on which the emitted light is not collected by the objective lens 27, have a spot size which is as small as possible in the light receiving means 28, it can be thought of changing either a distance between the recording layer on which the emitted light is collected and the recording layer on which the emitted light is not collected, or the lens magnification. The distance between the respective recording layers cannot be changed because of predetermined standard. The lens magnification is an optical lens magnification including the collimation lens 26 and the objective lens 27. For instance, in an optical system consisting of the collimation lens 26 and the objective lens 27, the lens magnification is indicated by the following formula (3).

(lens magnification)=(focal length of the collimation lens)÷(focal length of the objective lens)　　　(3)

The lens magnification is a value obtained by splitting the focal length of the collimation lens 26 by the focal length of the objective lens 27. A focal length D1 of the collimation lens 26 is determined in association with a horizontal direction M in which a radiation angle of the emitted light due to the light source 23 becomes small in a far field pattern (abbreviated as FFP). The horizontal direction M is a direction perpendicular to a vertical direction N in which an active layer is laminated.

In a case where the radiation angle of the emitted light in the horizontal direction M is larger than a predetermined set value, the focal length of the collimation lens 27 is set so as to be longer than a focal length in the set value, in other words, an aperture number NA is set so as to be larger than an aperture number in the set value. In a case where the radiation angle of the emitted light in the horizontal direction is smaller than the predetermined set value, the focal length of the collimation lens 27 is set so as to be smaller than the focal length in the set value, in other words, the aperture number NA is set so as to be smaller than the aperture number in the set value.

As shown in FIG. 17, for instance in a case where the focal length D1 of the objective lens 27 is constant, the radiation angle of the emitted light in the horizontal direction M of the light source 23 is set to be a large, and then a focal length D3 which is longer than focal length D2 of the collimation lens 26, is made. This makes it possible to increase the lens magnification, but various influences are given to the light source 23, to be specific, a property of a laser diode (abbreviated as LD) chip by a change of the FFP or the like and therefore, it cannot be easily changed. Consequently, the lens magnification is one of parameters which cannot be easily changed. The light source 23 is set so as to emit light, for instance, of the FFP, in a range of the radiation angle of 12 degrees or more and 14 degrees or less in the horizontal direction M, and in a range of the radiation angle of 15 degrees or more and 20 degrees or less in the vertical direction N.

The hologram pattern 25 may be configured in a single body with a glass substrate, for instance. Moreover, the optical pickup apparatus 20 may comprise a one-quarter wavelength plate interposed between the hologram pattern 25 and the collimation lens 26. Further, the optical pickup apparatus 20 may have a configuration such that the hologram pattern 25 is provided on the glass substrate, and a hologram element to be provided in a single body with other optical components or the like is provided.

Moreover, because of the optical configuration including the collimation lens 26 and the objective lens 27, in a case where the light collection position of the emitted light from the light source 23 is located on the second recording layer 21b, there is a possibility that the reflected light from the first recording layer 21a is irradiated in a state of being focused on the hologram pattern 25. Even in such a case, likewise as described above, the reflected light from the first recording layer 21a can be prevented from being irradiated onto the first and second TES splitting portions 35 and 36. This makes it possible to realize the stable track servo.

According to the embodiment, by the optical configuration including the objective lens 27, the hologram pattern 25 and the like, the reflected light from other recording layers except for one recording layer is irradiated in a state of being focused on the hologram pattern 25. This leads the reflected light from the other recording layers to the axial vicinity portion 38, and prevents the reflected light from entering the first and second TES splitting portions 35 and 36, and then being received by the first and second TES light receiving portions 45 and 46, so that the correct track position information and shift information can be reliably obtained.

By obtaining the correct shift information, it is possible to solve troubles such that the objective lens 27 is driven beyond the movable range. Furthermore, by obtaining the correct track position information and shift information, the objective lens 27 can be correctly controlled, and thereby the light collection position of the emitted light in the recording medium 21 can be correctly controlled. Consequently, the stable track servo can be realized.

Moreover, according to the embodiment, even when the objective lens 27 is made to be displaced in a direction perpendicular to the optical axis of the emitted light led to the objective lens 27 so that the light collection position of the emitted light in the recording medium 21 is changed, the reflected light reflected by the other recording layers is prevented from being led to the first and second TES splitting portions 35 and 36, and can be reliably led to only the axial vicinity portion 38.

Moreover, according to the embodiment, in a case where the light collection position of the emitted light is located on the first recording layer 21b, the reflected light reflected by the first recording layer 21b is irradiated onto the hologram pattern 25 in a radiation range which is smaller than that of the reflected light reflected by the first recording layer 21a. This makes it possible to make a region in which the axial vicinity portion 38 is formed, as small as possible, and to make the light intensity of the reflected light led to the first and second TES splitting portions 35 and 36, as high as possible.

Moreover, according to the embodiment, the light source 23 is configured so as to emit light whose central wavelength is within a wavelength range of 650 nanometer or more and 660 nanometer or less and therefore, convenience can be enhanced with respect to the recording medium 21 such as a digital versatile disk (abbreviated as DVD), for instance.

Moreover, according to the embodiment, even in a case of using the main beam 30 and the sub beam 31, the main beam 30 and the sub beam 31 which are reflected by the other recording layers can be led to only the axial vicinity portion 38 after preventing the beams from being led to the first and second TES splitting portions 35 and 36. This makes it possible to reliably obtain the correct tracking position information and shift information.

Moreover, according to the embodiment, in a case where the control means 29 obtains the focus position information in accordance with the knife-edge method based on the result of the light reception by the FES light receiving portion 47, it is possible to enhance convenience by, for instance, obtaining the correct focus position information.

Moreover, according to the embodiment, in a case where the control means 29 obtains the track position information in accordance with a phase contrast method based on the respective light receiving results due to the first and second TES light receiving portions 35 and 36, it is possible to enhance convenience by, for instance, obtaining the correct track position information.

Moreover, according to the embodiment, in a case where the control means 29 obtains the track position information in accordance with the differential push pull method based on the respective light receiving results due to the first and second TES light receiving portions 35 and 36, it is possible to enhance convenience by, for instance, obtaining the correct track position information.

Moreover, according to the embodiment, the axial vicinity portion 38 is a circular portion having the splitting axial line L25 as a center and therefore, the reflected light which is irradiated onto the hologram pattern 25 in a state of being focused from the other recording layers can reliably be made to enter the axial vicinity portion 38. Moreover, the reflected light from the other recording layers is circular in the hologram pattern 25 and therefore, it is possible to reliably irradiate inside a region in which the circular axial vicinity portion 38 is formed. This makes it possible to reliably prevent the reflected light from the other recording layers from entering the first and second TES splitting portions 35 and 36.

Moreover, according to the embodiment, by providing the hologram pattern 25 serving as also a splitter on the optical pickup apparatus 20, even when the reflected light from the other recording layers except for the one recording layer is irradiated in a state of being focused on the hologram pattern 25, the reflected light from the other recording layers is led to the axial vicinity portion 38. This makes it possible to prevent the reflected light from the other recording layers from entering the first and second TES splitting portions 35 and 36, and being received by the first and second TES light receiving portions 45 and 46, so that the correct track information and shift information can be reliably obtained.

By obtaining the correct shift information, it is possible to solve troubles such that the objective lens 27 is driven beyond the movable range. Furthermore, by obtaining the correct track position information and shift information, the objective lens 27 can be correctly controlled, and thereby the light collection position of the emitted light in the recording medium 21 can be correctly controlled. Consequently, the stable track servo can be realized. Moreover, by the hologram pattern 25 serving as also the splitter, it is possible to realize the stable track servo regardless of a configuration of the hologram element comprising the hologram pattern 25, presence or absence of a micro prism having a polarization plane, and presence or absence of the polarization property.

Figure 18:
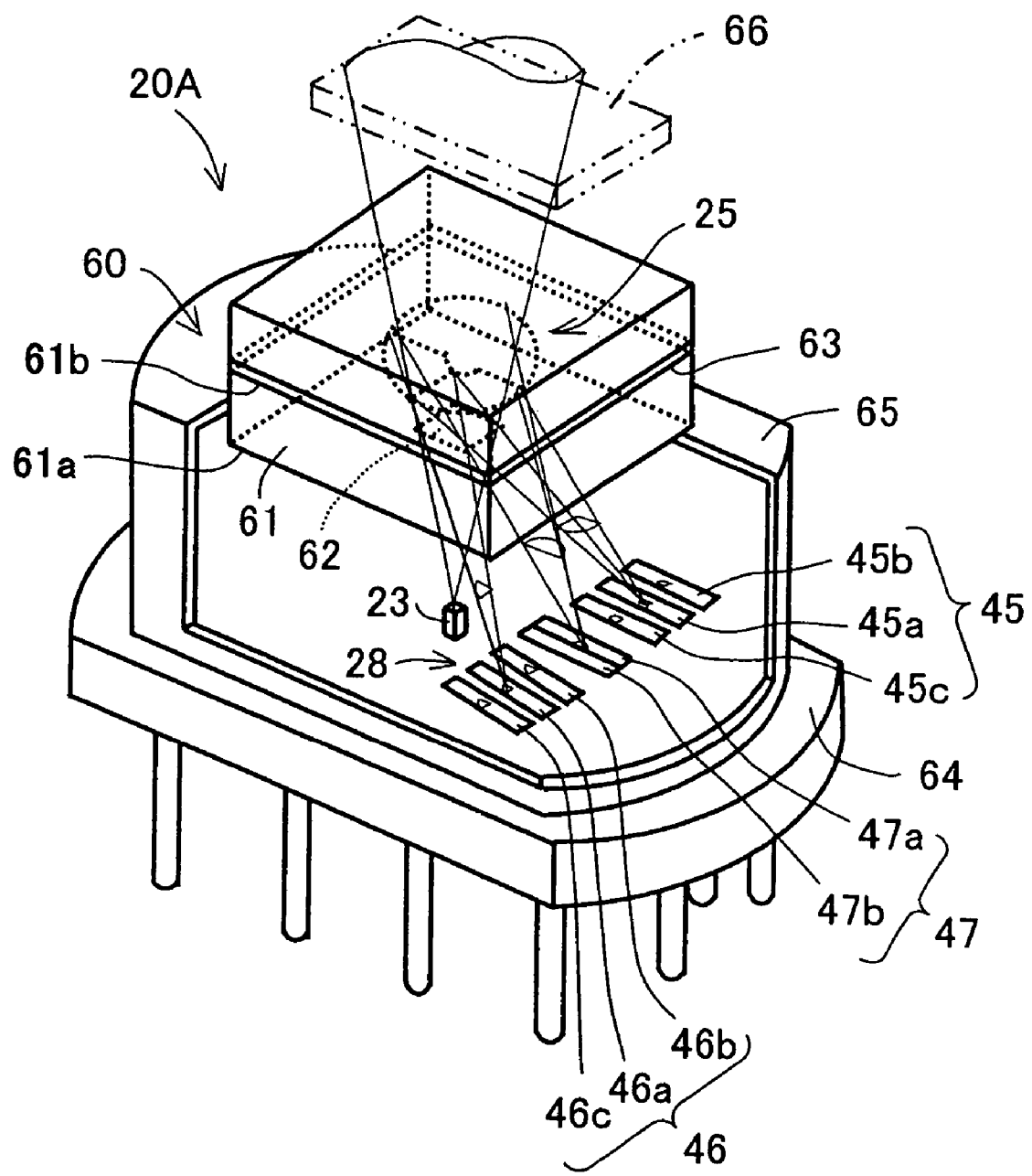
FIG. 18 is a perspective view showing a part of an optical pickup apparatus 20A according to a second embodiment of the invention.
Figure 19:
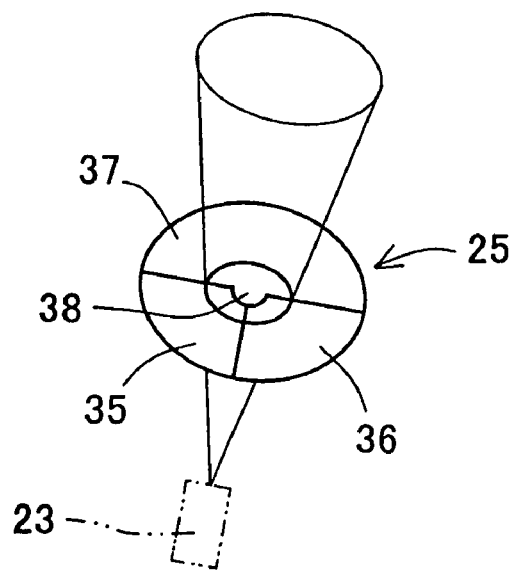
FIG. 19 is a view for explaining one example of an emitted light from a light source 23, the emitted light being led to the hologram pattern 25.
Figure 20:
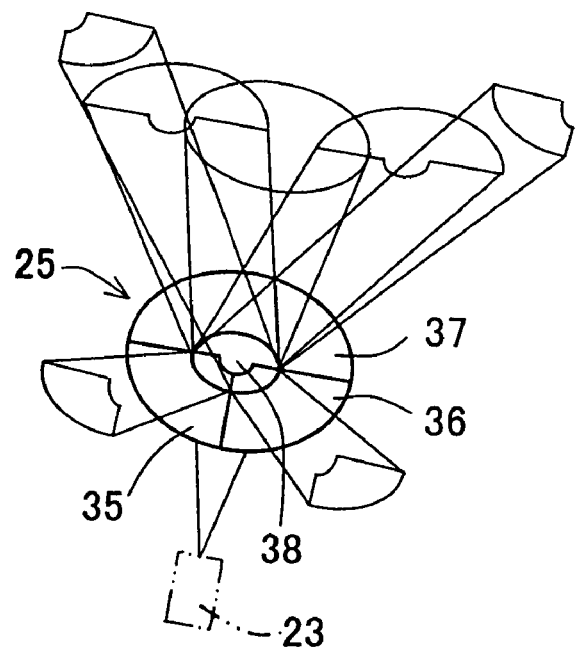
FIG. 20 is a view for explaining another example of the emitted light from the light source 23, the emitted light being led to the hologram pattern 25.

FIG. 18 is a perspective view showing a part of the optical pickup apparatus 20A according to a second embodiment of the invention. FIG. 19 is a view for explaining one example of the emitted light from the light source 23, the emitted light being led to the hologram pattern 25. FIG. 20 is a view for explaining another example of the emitted light from the light source 23, the emitted light being led to the hologram pattern 25. In FIG. 18, the optical pickup apparatus 20A is shown by cutting away a part thereof, and the collimation lens 26 and the objective lens 27 are omitted. In the optical pickup apparatus 20A of the embodiment, the same configurations as in the above-described optical pickup apparatus 20 of the first embodiment will be denoted by the same reference numerals, and descriptions relating to the same configurations and effects will be omitted.

In the optical pickup apparatus 20A of the embodiment, the light source 23, the hologram pattern 25, and the light receiving means 28 are unitized as a hologram laser 60 serving as a light emitter so as to be configured in a single body. The hologram laser 60 has a hologram element 61. The hologram element 61 is interposed between the light source 23 and the objective lens 27, and formed into a platy shape. The hologram element 61 has a diffraction grating 62 formed on one surface portion 61a facing the light source 23, and the hologram patter 25 formed on the other surface portion 61b opposite the light source 23. The diffraction grating 62 is, similarly to the grating lens 24, diffracting means for forming the main beam 30 and the sub beam 31.

The hologram element 61 has a polarization property that a refractive index is different with respect to a polarizing direction of light. The hologram element 61 has a birefringent portion 63. The birefringent portion 63 is disposed on one surface portion opposite the light source 23 with respect to the hologram pattern 25. The birefringent portion 63 is formed of a birefringent material, and has a property that a refractive index is different depending on a polarizing direction of light. The light source 23 and the light receiving means 28 are provided on a stem 64 of the hologram laser 60, and housed in an inner space formed by the stem 64 and a cap 65. The hologram element 61 is provided on an outer surface portion of the cap 65, and an emitted light from the light source 23 enters the hologram element 61 via a through hole formed in the cap 65, for instance.

The optical pickup apparatus 20A further comprises a one-quarter wavelength plate 66. The one-quarter wavelength plate 66 serving as a polarizing direction changing means changes a polarizing direction of the reflected light from the recording medium 21 to a direction which is different from a polarizing direction of the emitted light from the light source 23. The one-quarter wavelength plate 66 is provided separately from the hologram element 61. The one-quarter wavelength plate 66 changes light which is linearly polarized in a predetermined polarizing direction to light which is circularly polarized by angularly displacing around the optical axis, and emits the light. The one-quarter wavelength plate 66 changes light which is circularly polarized to light which is linearly polarized by angularly displacing around the optical axis, and emits the light. The one-quarter wavelength plate 66 is interposed between the hologram laser 60 and the objective lens 27, to be specific, the hologram pattern 25 and the collimation lens 26.

As shown in FIG. 20, in a hologram element that the hologram pattern 25 is provided on a glass substrate or the like, the emitted light from the light source 23 is diffracted and split on the respective first and second TES splitting portions 35 and 36 and FES splitting portion 37. A diffraction efficiency in the hologram pattern 25 depends on a depth of the groove. The light intensity of the plus and minus first-order diffraction light needs to be as high as possible in the recording medium 21 on the outward path in the optical pickup apparatus capable of recording main information that approximately 40% of the emitted light from the light source 23 becomes a maximum value and therefore, it is desired to make a loss of the light intensity small by decreasing the diffraction efficiency. On the backward path, it is desired to make the diffraction efficiency high, and lead the diffracted light having as high light intensity as possible to the light receiving means 28, and then enhance S/N ratio. In FIG. 20, the hologram element comprises the hologram pattern 25 and the glass substrate and therefore, it is impossible to accomplish the desire on the outward path and the desire on the backward path at the same time.

In the embodiment, the hologram pattern 25 has a depth of a groove set in order to lower the diffraction efficiency on the outward path. Moreover, the hologram pattern 25 is provided with the above-described birefringent portion 63 in order to make the diffraction efficiency on the backward path high. Further, the emitted light emitted by the light source 23 is light which is linearly polarized in the predetermined polarizing direction so as not to be split in the hologram patter 25.

The emitted light emitted from the light source 23 is diffracted by the diffraction grating 62 and thereby, being split into the main beam 30 and the first and second sub beams 31a and 31b, and then led to the hologram pattern 25. The emitted light led to the hologram pattern 25 is not split by the hologram pattern 21, and transmitted by the hologram pattern 25 as shown in FIG. 20. Since the emitted light transmitted by the hologram pattern 25 has a polarizing direction which is not refracted by the birefringent portion 63, the emitted light is transmitted as it is and then, led to the one-quarter wavelength plate 66. The one-quarter wavelength plate 66 angularly displaces the led emitted light around the optical axis by only 45 degrees so as to change the light to light which is circularly polarized, and emits the light. The emitted light from the one-quarter wavelength plate 66 is irradiated onto the recording medium 21 in a collected state via the collimation lens 26 and the objective lens 27.

The reflected light from the recording medium 21 is led to the one-quarter wavelength plate 66 via the collimation lens 26 and the objective lens 27. The reflected light which has been led from the recording medium 21 and transmitted by the one-quarter wavelength plate 66 is changed to a polarizing direction which is angularly displaced by only 90 degrees from the polarizing direction at the time of being emitted from the light source 23, and then led to the birefringent portion 63. In the birefringent portion 63, the reflected light from the recording medium 21, which is led from the one-quarter wavelength plate 66 is changed to a polarizing direction that the diffraction efficiency becomes the highest. By so doing, the birefringent portion 63 splits the reflected light on the respective first and second TES splitting portions 35 and 36 and FES splitting portion 37 in cooperation with the hologram pattern 25, and leads the reflected light to the light receiving means 28.

By thus providing the birefringent portion 63 on the hologram pattern 25, it is possible to lower the diffraction efficiency of light on the outward path even when the depth of the groove is made to be large so that the diffraction efficiency of light on the outward path becomes the largest. This makes it possible to largely enhance a usability of the light. Consequently, when recording and reproducing the main information, convenience can be enhanced. Moreover, in the hologram pattern 25, the radiation range which is a spot size of the reflected light from the recording medium 21 does not depend on a polarization situation and therefore, the same effect can be obtained as in the above-described optical pickup apparatus 20 of the first embodiment.

According to the embodiment, the hologram pattern 25 is interposed between the light source 23 and the objective lens 27. The hologram laser has a polarizing property of transmitting the emitted light from the light source 25 without splitting it in the hologram patter 25. This makes it possible to enhance the usability of the light by, for instance, removing the loss of the light intensity at the time that the emitted light from the light source 23 is irradiated onto the recording medium 21.

Moreover, according to the embodiment, the one-quarter wavelength plate 66 is interposed between the hologram pattern 25 and the objective lens 27. The one-quarter wavelength plate 66 changes the polarizing direction of the reflected light from the recording medium 21 to a direction which is different from the polarizing direction of the emitted light from the light source 23 around a time that the reflected light enters the one-quarter wavelength plate 66. This enables the emitted light from the light source 23 to be transmitted without being diffracted by optical components such as the hologram pattern 25 interposed between the light source 23 and the recording medium 21, and the reflected light from the recording medium 21 to be diffracted and reflected by the optical components. This makes it possible to enhance the usability of the light.

Figure 21:
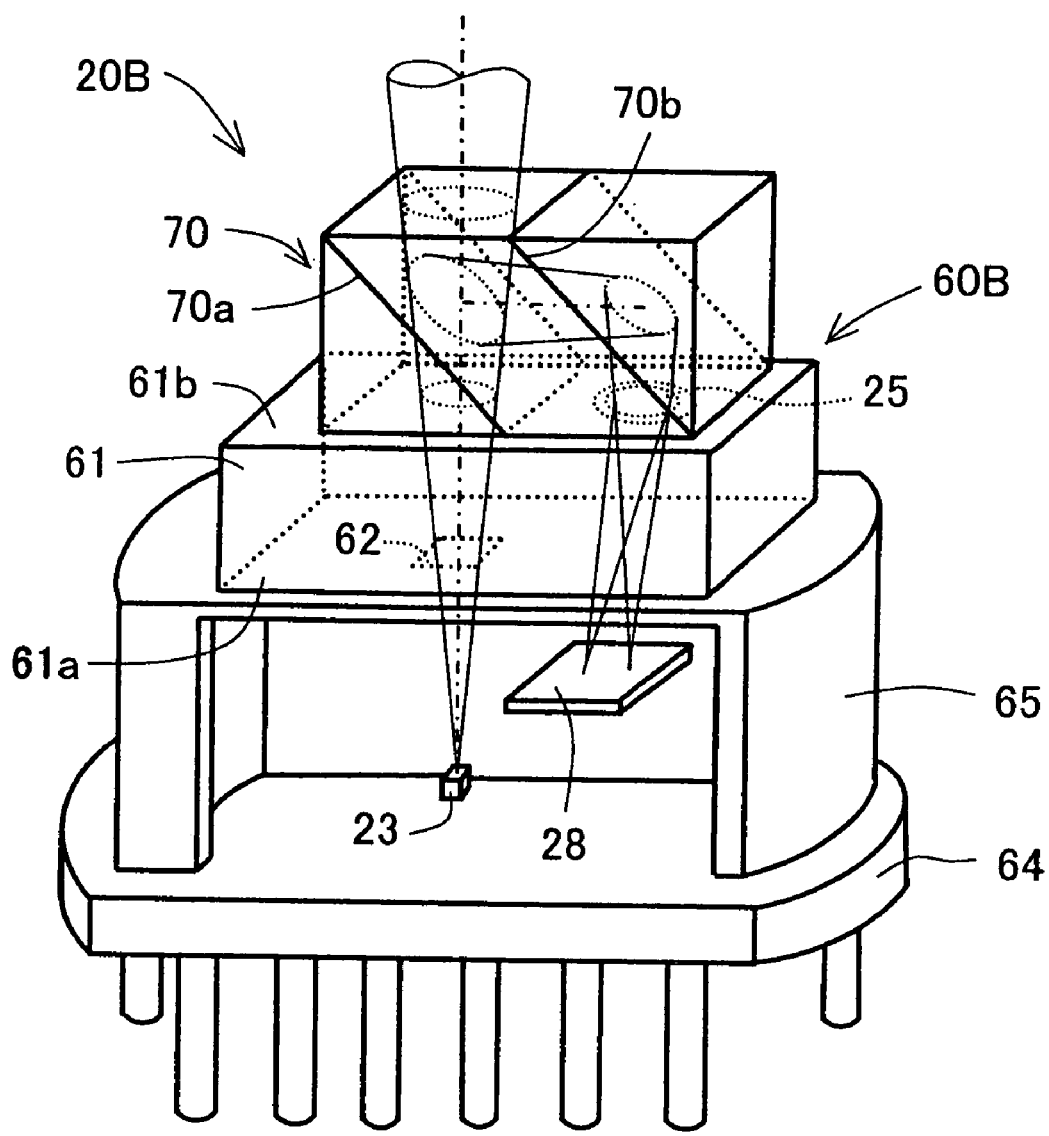
FIG. 21 is a perspective view showing an optical pickup apparatus 20B according to a third embodiment of the invention.

FIG. 21 is a perspective view showing an optical pickup apparatus 20B according to a third embodiment of the invention. In FIG. 21, the optical pickup apparatus 20B is shown by cutting away a part thereof, and the collimation lens 26, the objective lens 27, and the one-quarter wavelength plate 66 are omitted. In the optical pickup apparatus 20B of the embodiment, the same configurations as in the above-described optical pickup apparatuses 20 and 20A of the first and second embodiments will be denoted by the same reference numerals, and the same descriptions will be omitted.

In the optical pickup apparatus 20B of the embodiment, in order to avoid splitting of the emitted light due to diffraction of the hologram pattern 25 on the outward path, the hologram pattern 25 is disposed at such a position that the hologram pattern 25 is irradiated with light on the backward path. A hologram laser 60B further has a polarizing prism 70 in addition to the configuration of the above-described hologram laser 60 of the second embodiment.

The polarizing prism 70 serving as light guiding means is interposed between the light source 23 and the objective lens 27. The polarizing prism 70 leads the emitted light emitted from the light source 23 to the objective lens 27 without splitting it in the hologram pattern 25, and leads the reflected light reflected by the recording medium 21 to the hologram pattern 25. The polarizing prism 70 has a first polarizing surface 70a interposed between the diffraction grating 62 and the collimation lens 26, a second polarizing surface 70b for leading the light reflected by the first polarizing surface 70a to the hologram pattern 25.

The emitted light emitted from the light source 23 is led to the first polarizing surface 70a via the diffraction grating 62. The emitted light from the surface 23 enters the first polarizing surface 70a in a state of being linearly polarized so as not to be reflected by the first polarizing surface 70a. By so doing, the emitted light is transmitted by the first polarizing surface 70a as it is without being reflected and then, irradiated onto the recording medium 21 via the one-quarter wavelength plate 66, collimation lens 26, and the objective lens 27. The reflected light from the recording medium 21 is led to the first polarizing surface 70a via the objective lens 27, the collimation lens 26, and the one-quarter wavelength plate 66.

Since the reflected light from the recording medium 21 is transmitted by the one-quarter wavelength plate 66 on the outward path and on the backward path, the reflected light is led to the first polarizing surface 70a in a state where a polarizing direction thereof is angularly displaced around the optical axis by only 90 degrees with respect to the polarizing direction at the time that the reflected light has been emitted from the light source 23. By so doing, the first polarizing surface 70a reflects the reflected light from the recording medium 21, and leads the reflected light to the second polarizing surface 70b. The reflected light from the recording medium 21, which has been led to the second polarizing surface 70b is reflected by the second polarizing surface 70b, and led to the hologram pattern 25.

According to the embodiment, the polarizing prism 70 is interposed between the light source 23 and the objective lens 27. The polarizing prism 70 leas the emitted light emitted from the light source 23 to the objective lens 27 without splitting it in the hologram pattern 25, and leads the reflected light reflected by the recording medium 21 to the hologram pattern 25. Since the emitted light from the light source 23 is thus led to the recording medium 21 without hologram pattern 25 along the path, the usability of the light can be enhanced. Furthermore, the hologram pattern 25 can be disposed only on the backward path and therefore, it can be formed so that the diffraction efficiency is high, without lowering the usability of the light.

Figure 22:
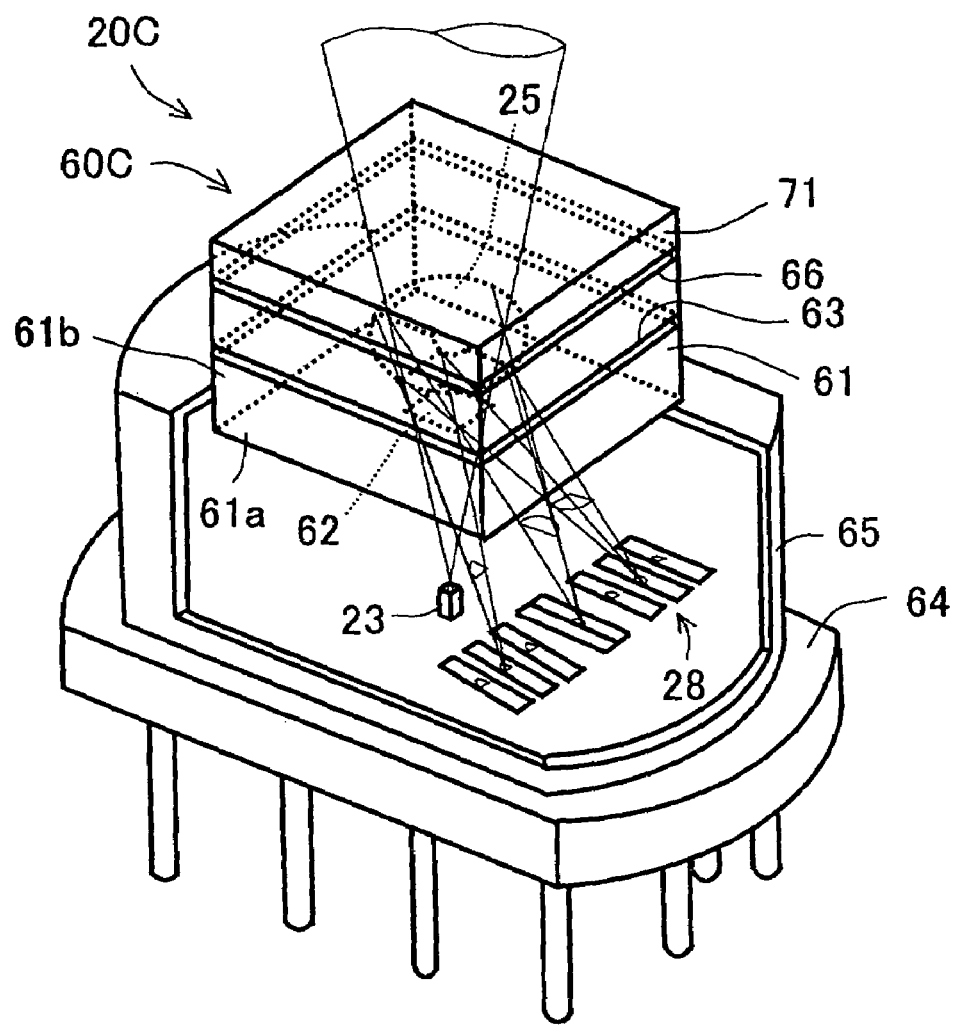
FIG. 22 is a perspective view showing an optical pickup apparatus 20C according to a fourth embodiment of the invention.

FIG. 22 is a perspective view showing an optical pickup apparatus 20C according to a fourth embodiment of the invention. In FIG. 22, the optical pickup apparatus 20C is shown by cutting away a part thereof. In the optical pickup apparatus 20C of the embodiment, the same configuration as in the above-described optical pickup apparatuses 20, 20A, and 20B of the first to third embodiments will be denoted by the same reference numerals, and descriptions relating to the same configurations and effects will be omitted.

In the above-described optical pickup apparatus 20A of the second embodiment, the hologram element 61 and the one-quarter wavelength plate 66 are separately configured. In contrast, the optical pickup apparatus 20C of the embodiment has the hologram laser 60C in which the hologram element 61 and the one-quarter wavelength plate 66 are configured in a single body. The one-quarter wavelength plate 66 is interposed between the hologram element 61 and the objective lens 27, to be specific, the hologram element 61 and the collimation lens 26. The one-quarter wavelength plate 66 is provided so as to contact one surface portion opposite the light source 23 with respect to the hologram pattern 25. The one-quarter wavelength plate 66 is formed into a film shape. In order to secure reliability, one surface portion of the one-quarter wavelength plate 66, the one surface portion being opposite the hologram pattern 25, is protected by a protective glass 71. By thus configuring the hologram laser 60C, in addition to the effects in the above-described first and second embodiments, it is possible to realize downsizing the optical pickup apparatus 20C.

Figure 23:
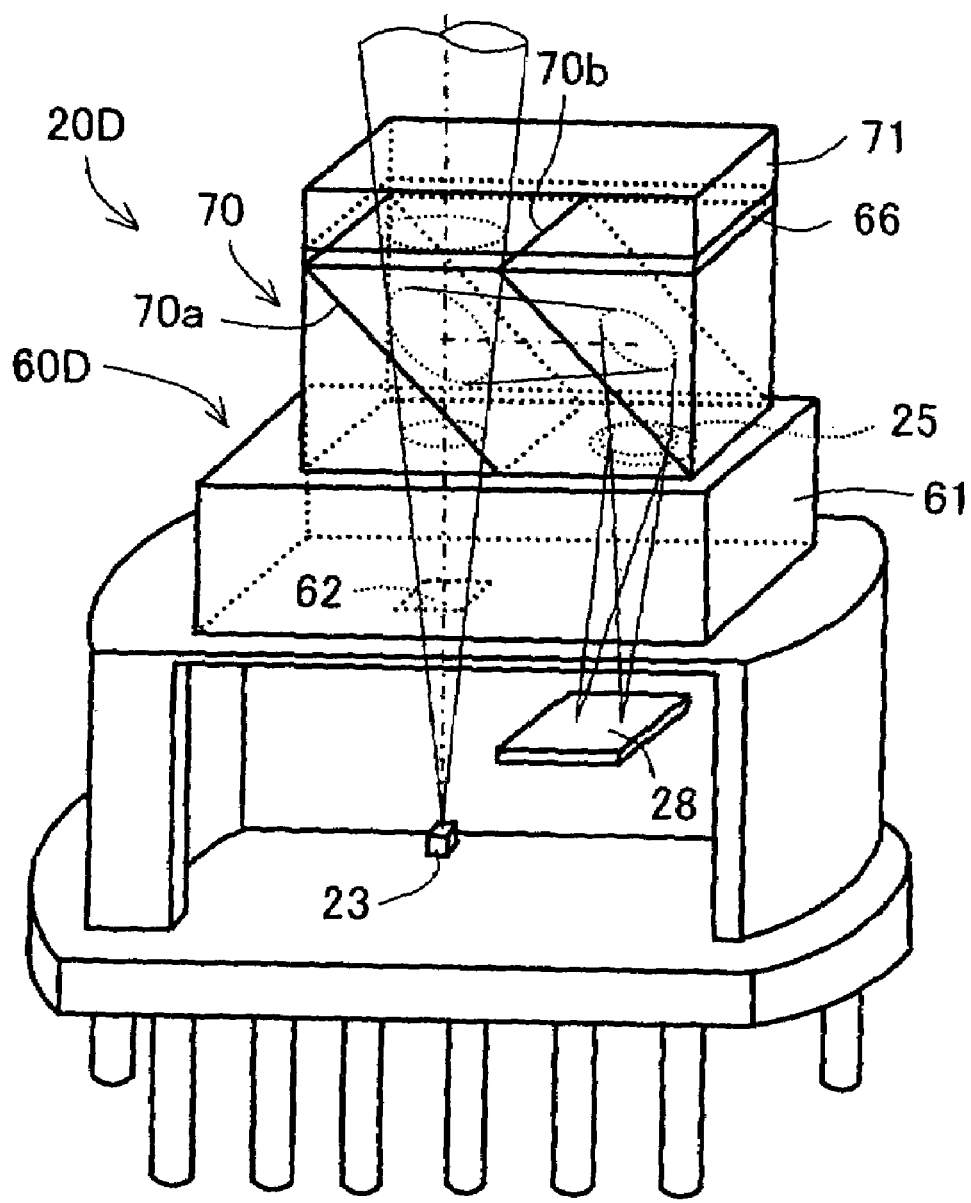
FIG. 23 is a perspective view showing an optical pickup apparatus 20D according to a fifth embodiment of the invention.

FIG. 23 is a perspective view showing an optical pickup apparatus 20D according to a fifth embodiment of the invention. In FIG. 23, the optical pickup apparatus 20D is shown by cutting away a part thereof. In the optical pickup apparatus 20D of the embodiment, the same configuration as in the above-described optical pickup apparatuses 20 and 20A to 20C of the first to fourth embodiments will be denoted by the same reference numerals, and the same descriptions will be omitted.

In the above-described optical pickup apparatus 20B of the third embodiment, the hologram element 61 and the one-quarter wavelength plate 66 are separately configured. In contrast, the optical pickup apparatus 20D of the embodiment has the hologram laser 60D in which the hologram element 61 and the one-quarter wavelength plate 66 are configured in a single body. The one-quarter wavelength plate 66 is interposed between the polarizing prism 70 and the objective lens 27, to be specific, the polarizing prism 70 and the collimation lens 26. By thus configuring the hologram laser 60D, in addition to the effects in the above-described first to third embodiments, it is possible to realize downsizing the optical pickup apparatus 20D.

Figure 24:
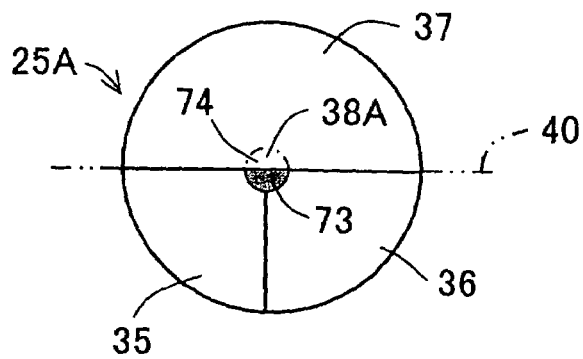
FIG. 24 is a plan view showing a hologram pattern 25A according to a second example.

FIG. 24 is a plan view showing a hologram pattern 25A according to the second example. In FIG. 24 and the following FIGS. 25 to 27, the hologram pattern has a groove formed therein, but it is shown in a simplified manner in order to facilitate illustrations. In the above-described optical pickup apparatuses 20, and 20A to 20D of the respective first to fifth embodiments, grooves are formed in the axial vicinity portion 38 of the hologram pattern 25 as in the FES splitting portion 37, but the hologram pattern 25A having an axial vicinity portion 38A shown in FIG. 24 is also applicable as a second example.

The axial vicinity portion 38A of the second example has a first regional portion 73 formed of a material which does not transmit light. The first regional portion 73 is formed into one half circle shape disposed opposite the FES splitting portion 37 with respect to the first virtual plane 40 at the time of being split into two with respect to the first virtual plane 40. By thus configuring the axial vicinity portion 38A, the reflected light from the second recording layer 21b is prevented from entering the first and second TES splitting portions 35 and 36 by the first regional portion 73 and therefore, it is possible to prevent the reflected light from the second recording layer 21b from being received by the first and second TES light receiving portions 35 and 36. Consequently, the stable tracking servo can be realized by obtaining the correct track position information and shift information.

Moreover, in the second regional portion 74 formed into the other half circle shape is formed the same groove as in the FES splitting portion 37. The reflected light from the second recording layer 21b, which has entered the second regional portion 74 is received by the FES light receiving region 37 together with the reflected light from the first recording layer 21a, which has entered the FES splitting portion 37.

Figure 25:
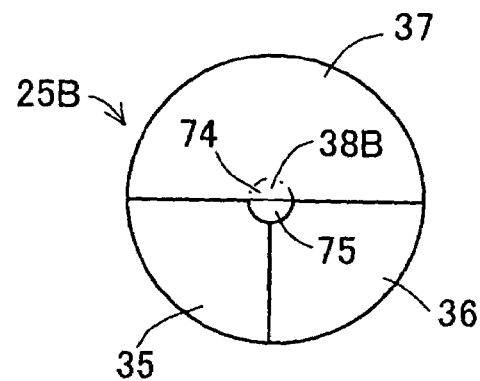
FIG. 25 is a plan view showing a hologram pattern 25B according to a third example.

FIG. 25 is a plan view showing a hologram pattern 25B according to a third example. Moreover, in the above-described axial vicinity portion 38A as another example, the first regional portion 73 is formed so as not to transmit light, but may be configured so as to transmit light without diffracting the light in the first regional portion 75 as a third example. Furthermore, in the axial vicinity portion 38B according to the third example, the first regional portion 75 has no groove formed therein and therefore, the reflected lights from the first and second recording layers 21a and 21b are both transmitted without being diffracted.

The reflected light from the first recording layer 21a has no changes in the light intensity of the reflected light received by the FES light receiving portion 47 since the second regional portion 74 in the axial vicinity portion 38B has a groove formed therein as in the FES receiving portion 37. This makes it possible to reliably obtain focus position information. Furthermore, in a case where the hologram pattern is disposed on the outward path, the light which enters the first regional portion 75 is not diffracted and therefore, the loss of the light intensity can be made as small as possible.

Figure 26:
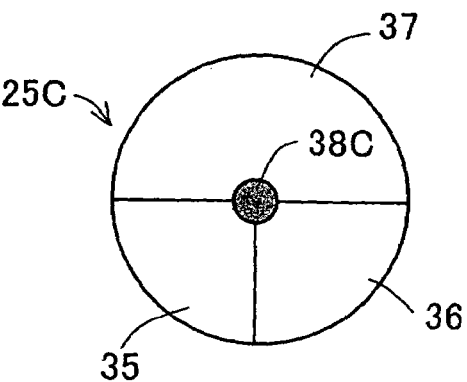
FIG. 26 is a plan view showing a hologram pattern 25C according to a fourth example.

FIG. 26 is a plan view showing a hologram pattern 25C according to a fourth example. In the above-described hologram pattern 25A of the second example, only the first regional portion 73 is formed so as not to transmit light, but an axial vicinity portion 38C may be formed of a material which does not transmit light as the fourth example. This prevents, in a case where the emitted light is collected onto the first recording layer 21a, the reflected light from the second recording layer 21b from entering the first and second TES splitting portions 35 and 36, and all removed by the axial vicinity portion 38C. Consequently, the stable tracking servo can be realized by obtaining the correct track position information and shift information.

Figure 27:
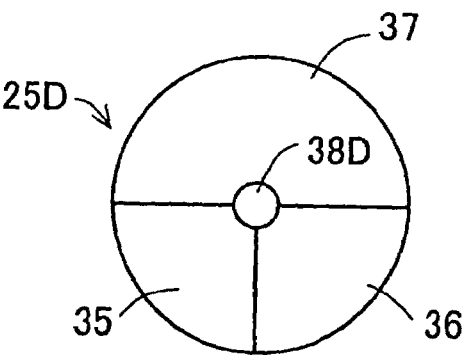
FIG. 27 is a plan view showing a hologram pattern 25D according to a fifth example.
Figure 28:
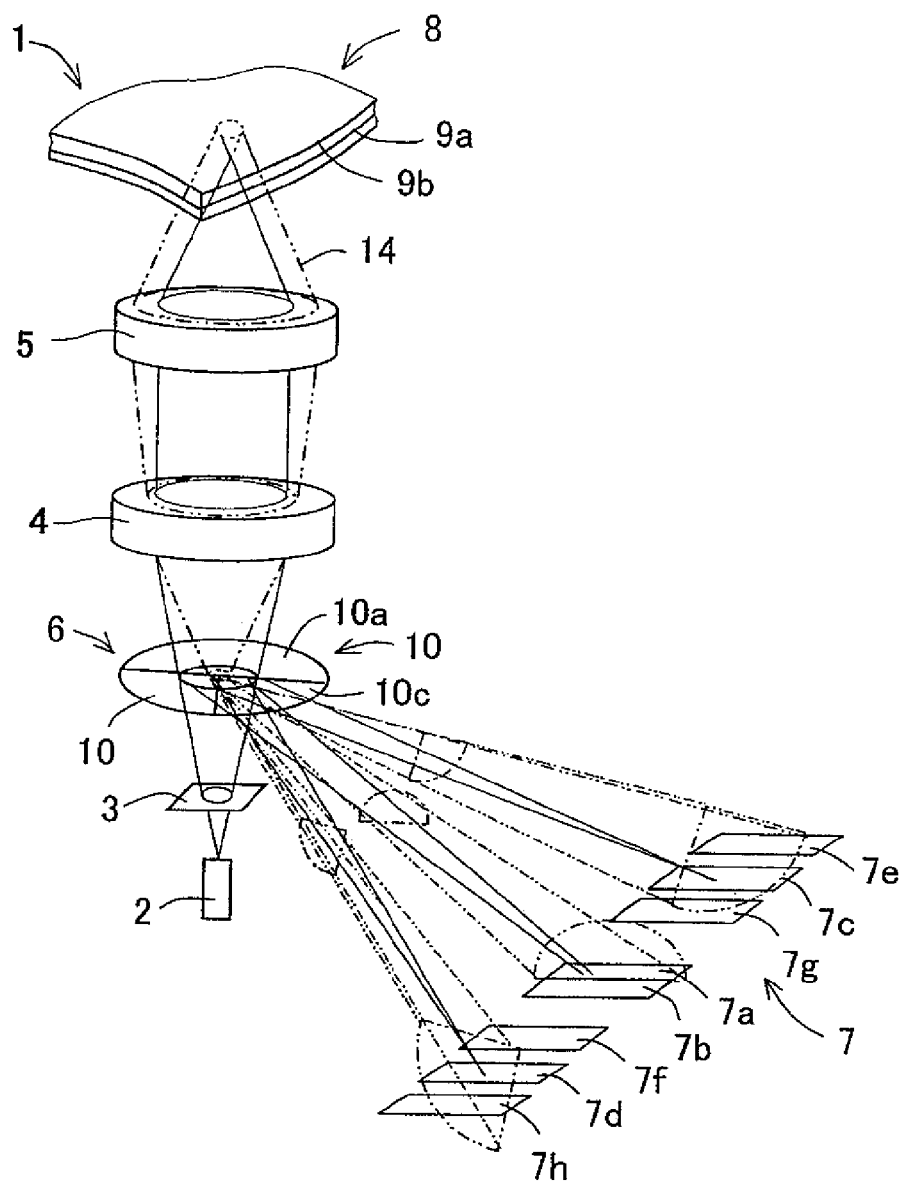
FIG. 28 is a perspective view showing a configuration of a conventional art optical pickup apparatus 1.
Figure 29:
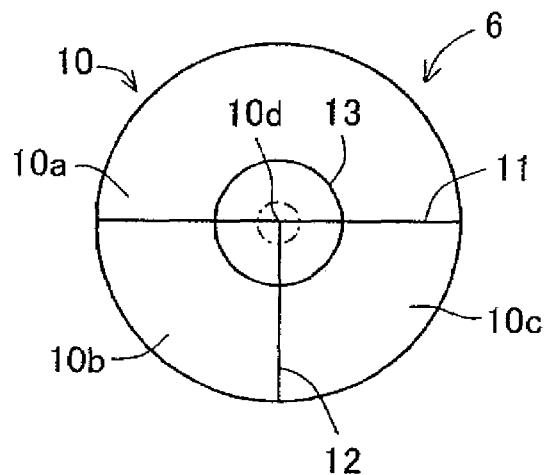
FIG. 29 is a front view showing a hologram pattern 10.
Figure 30:
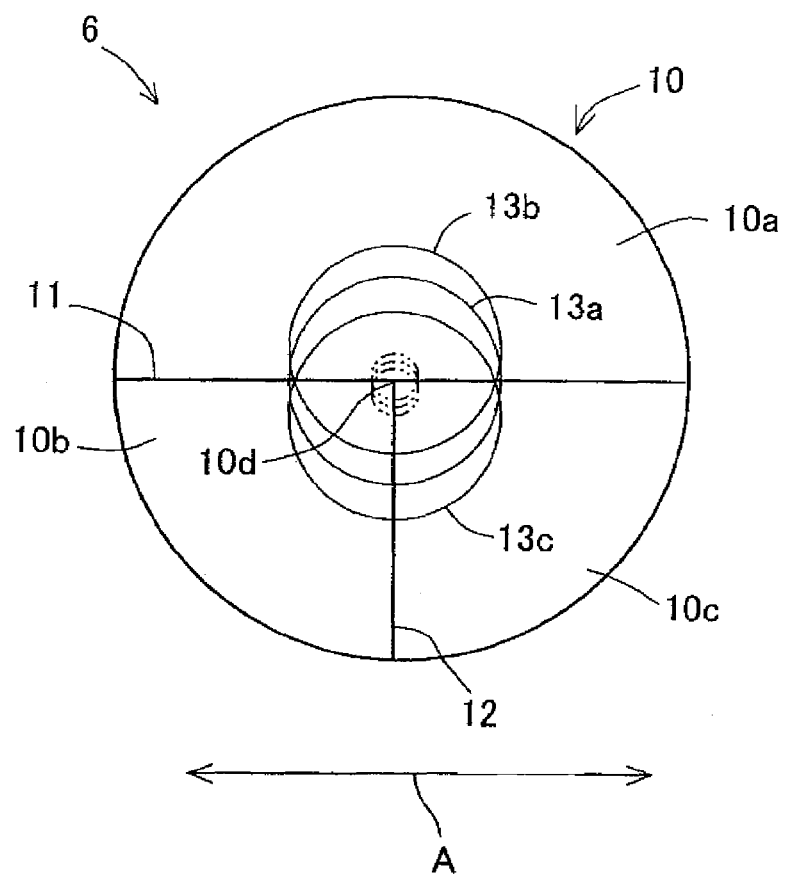
FIG. 30 is a view for explaining light from a first recording layer 9a in a state where an objective lens 5 is located at a neutral position.
Figure 31:
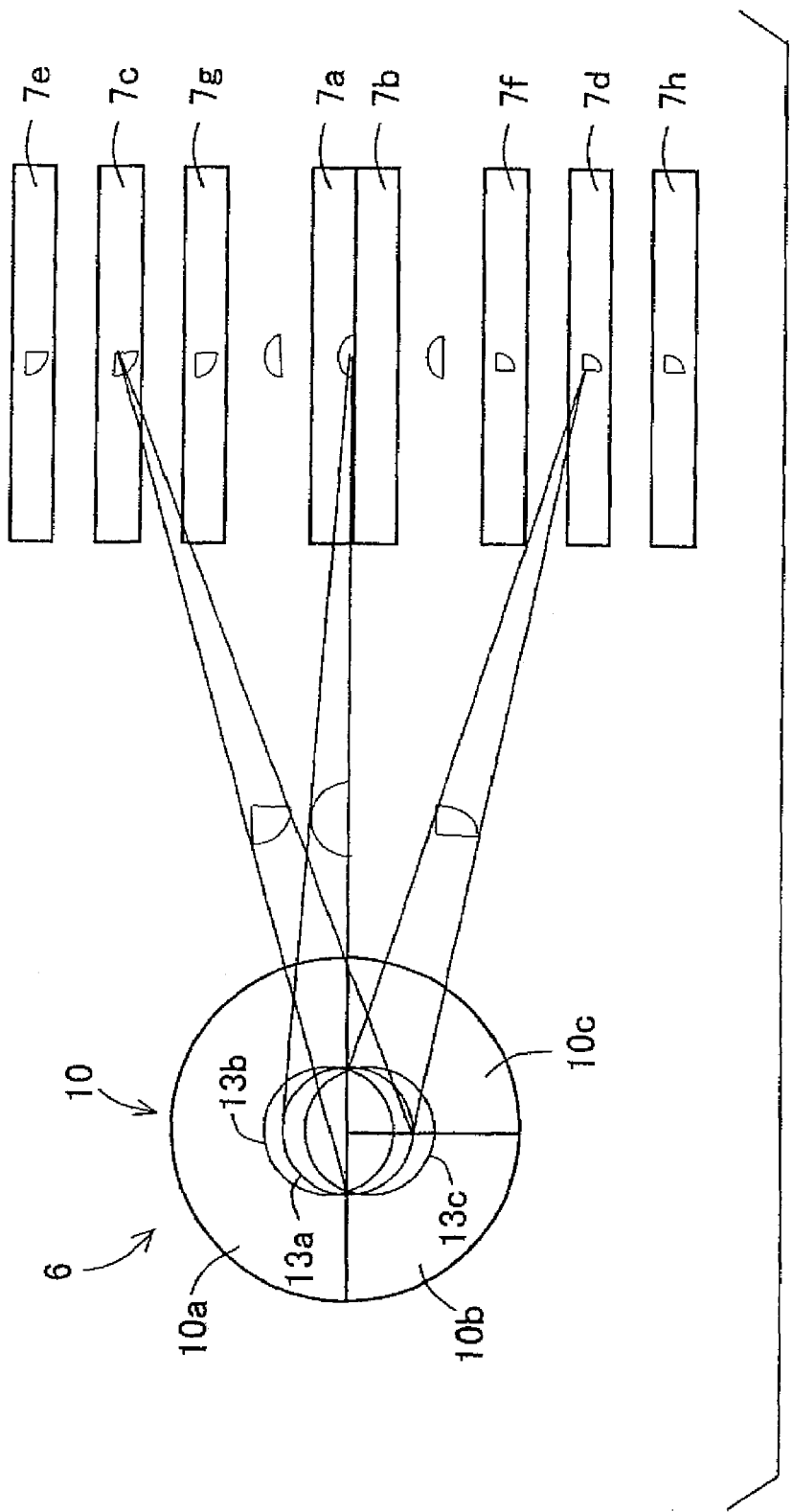
FIG. 31 is a view for explaining light led to respective light receiving elements 7a to 7h in a state where the objective lens 5 is located at the neutral position.
Figure 32:
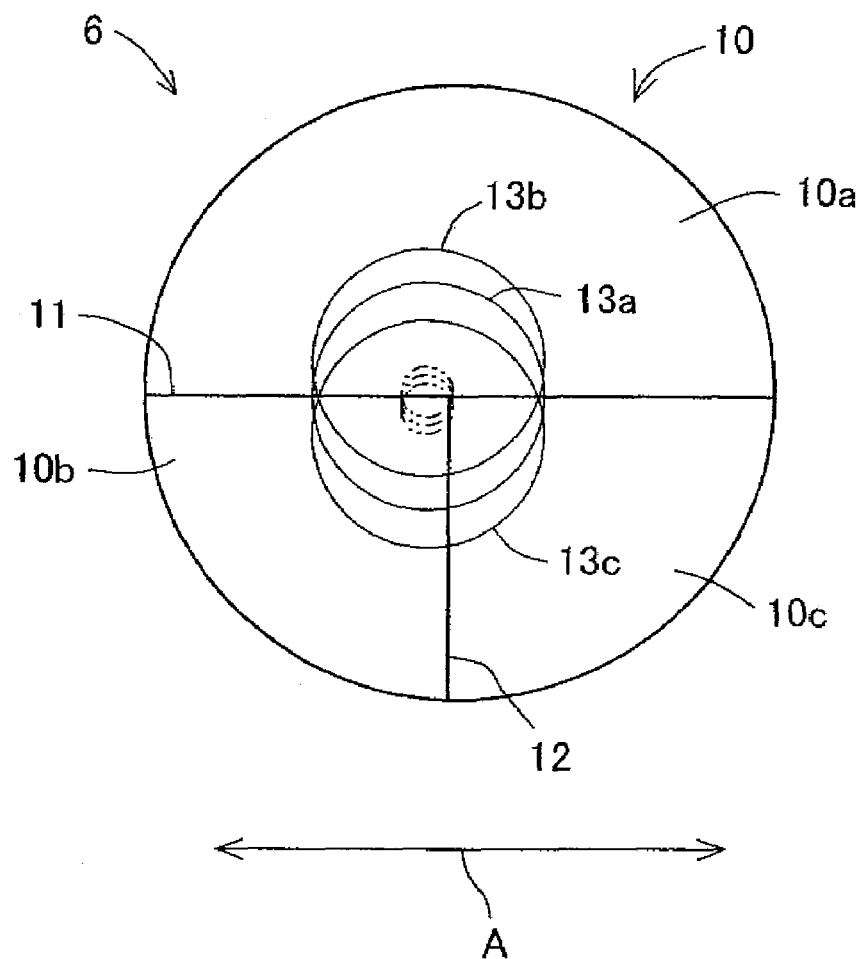
FIG. 32 is a view for explaining one example of light from the first recording layer 9a in a state where the objective lens 5 is located at a position which is shifted in a radial direction A from the neutral position.
Figure 33:
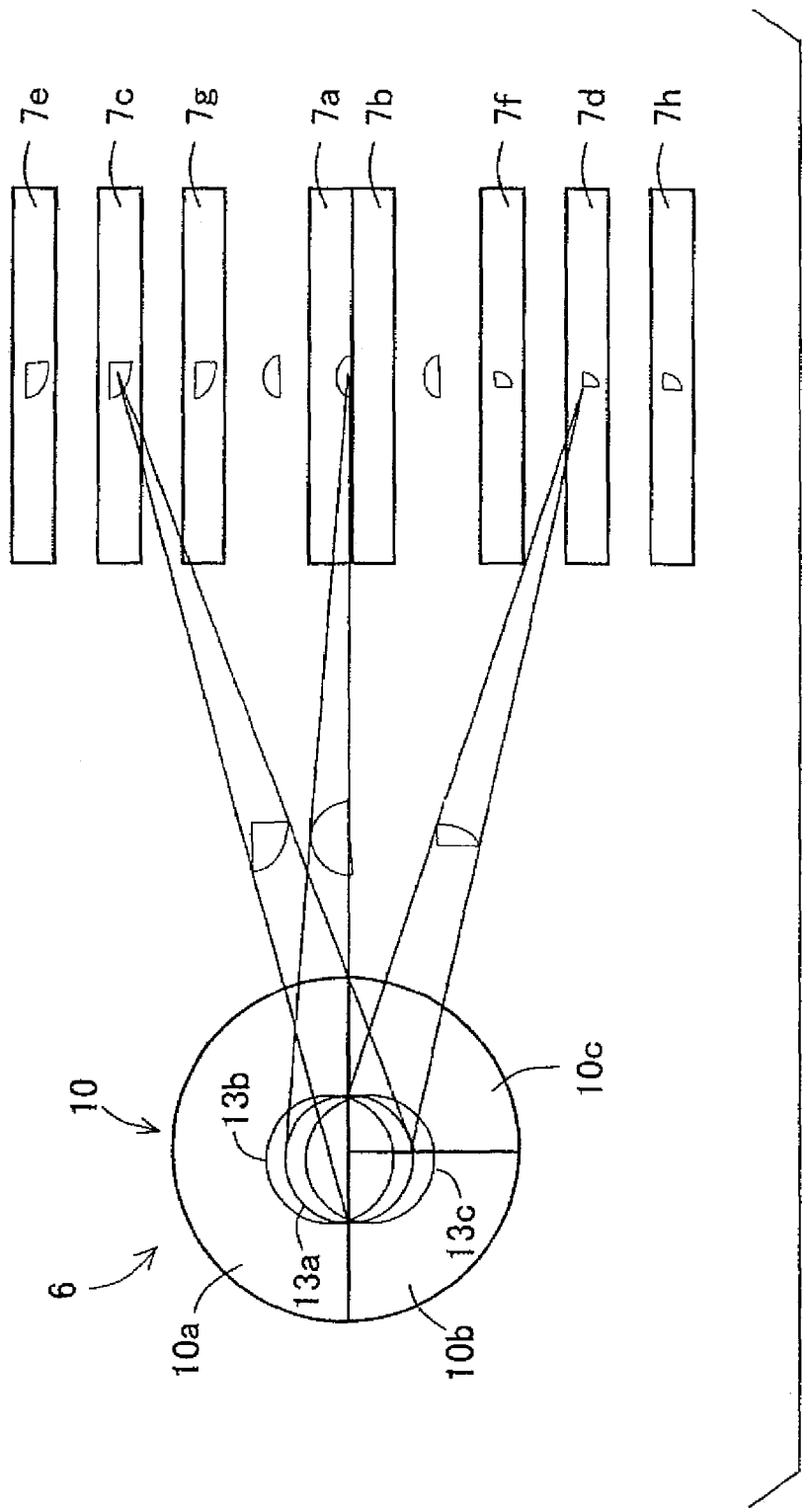
FIG. 33 is a view for explaining one example of light led to the respective light receiving elements 7a to 7h in a state where the objective lens 5 is located at the position which is shifted in the radial direction A from the neutral position.
Figure 34:
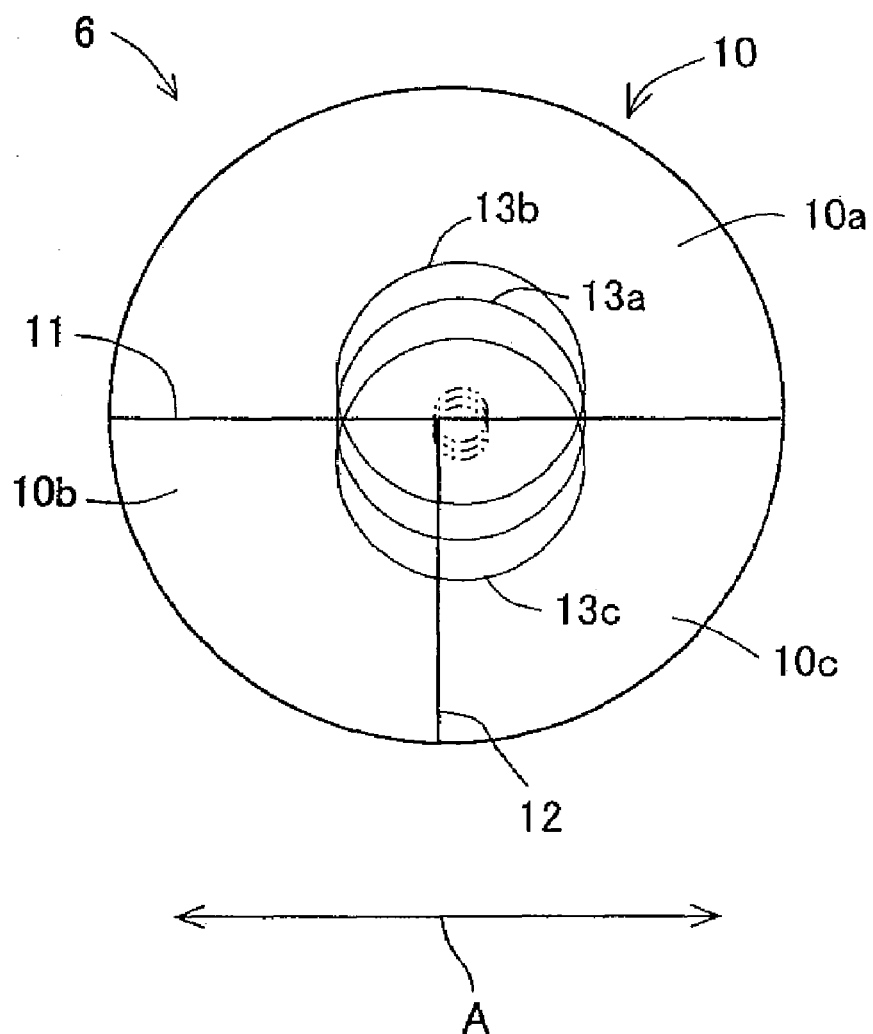
FIG. 34 is a view for explaining another example of light from the recording medium 8 in a state where the objective lens 5 is located at the position which is shifted in the radial direction A from the neutral position.
Figure 35:
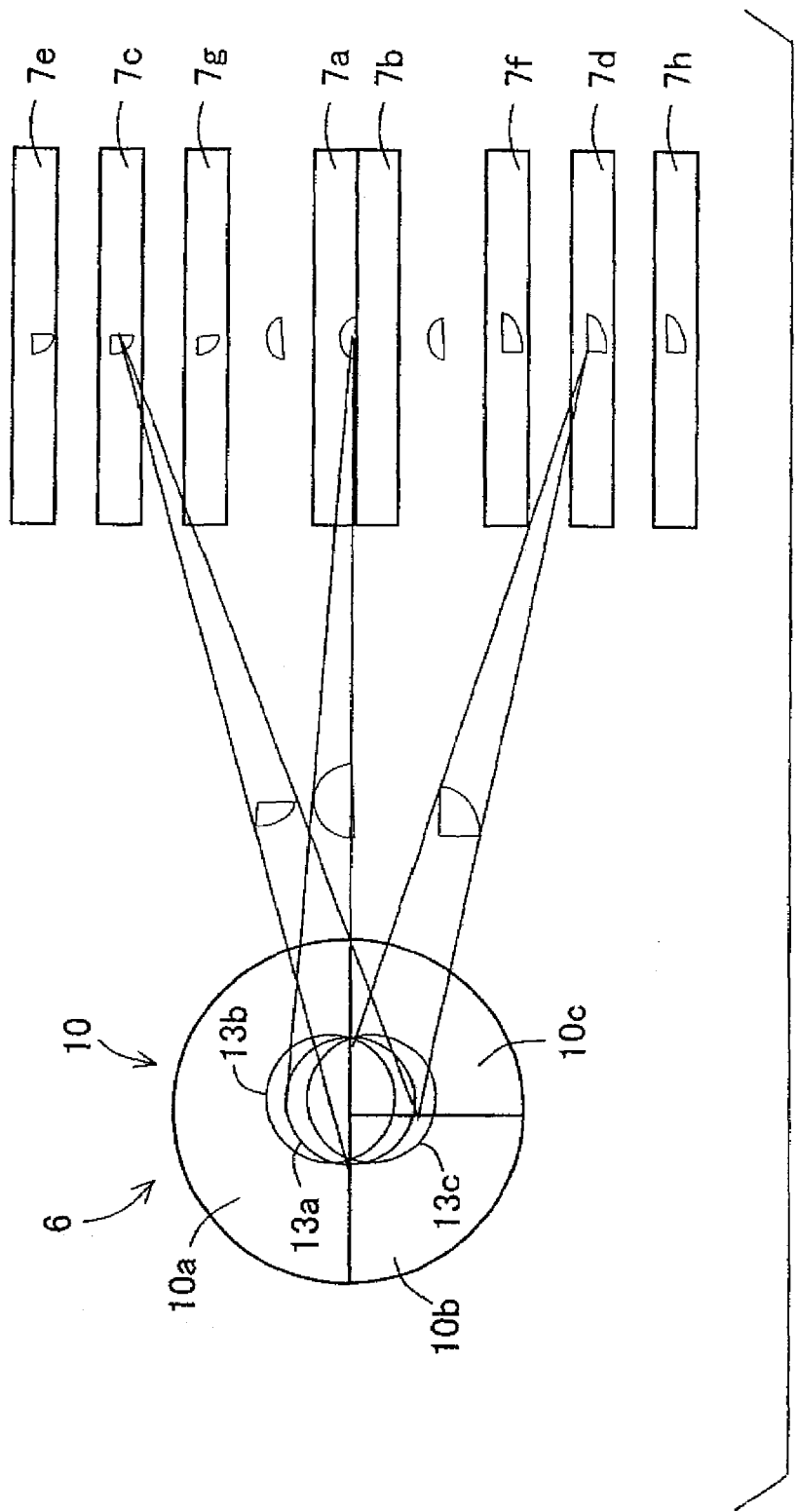
FIG. 35 is a view for explaining another example of the light led to the respective light receiving elements 7a to 7h in a state where the objective lens 5 is located at the position which is shifted in the radial direction A from the neutral position.
Figure 36:
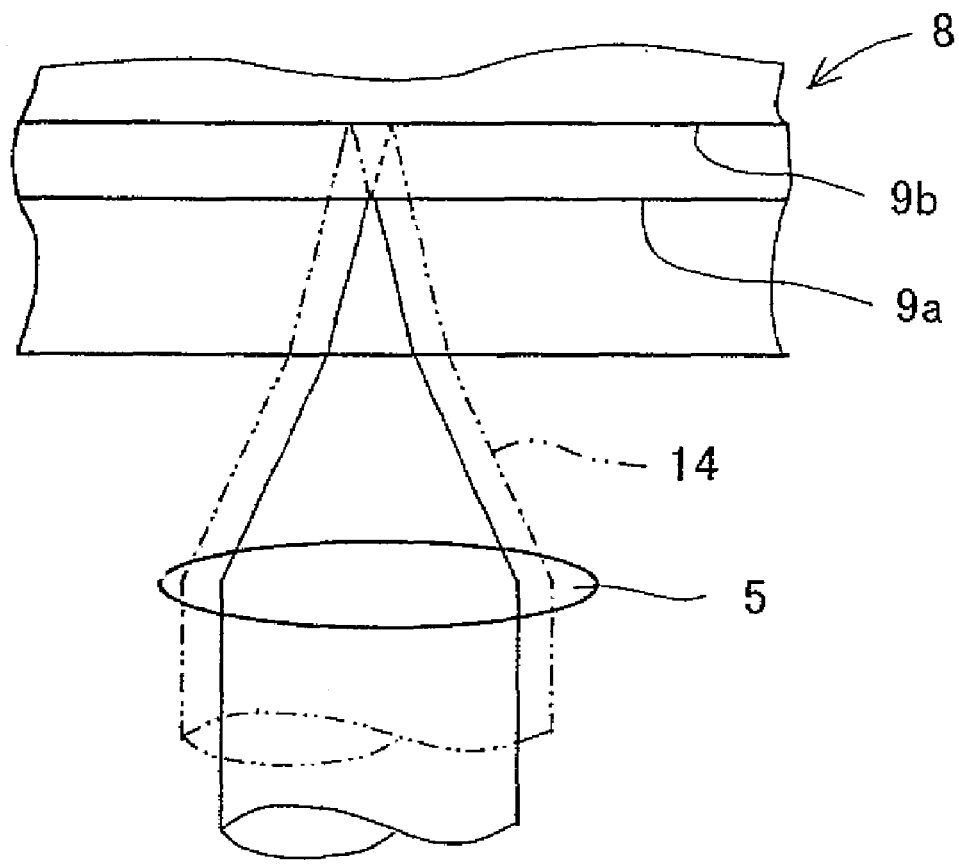
FIG. 36 is a view for explaining reflected lights from the first and second recording layers 9a and 9b.
Figure 37:
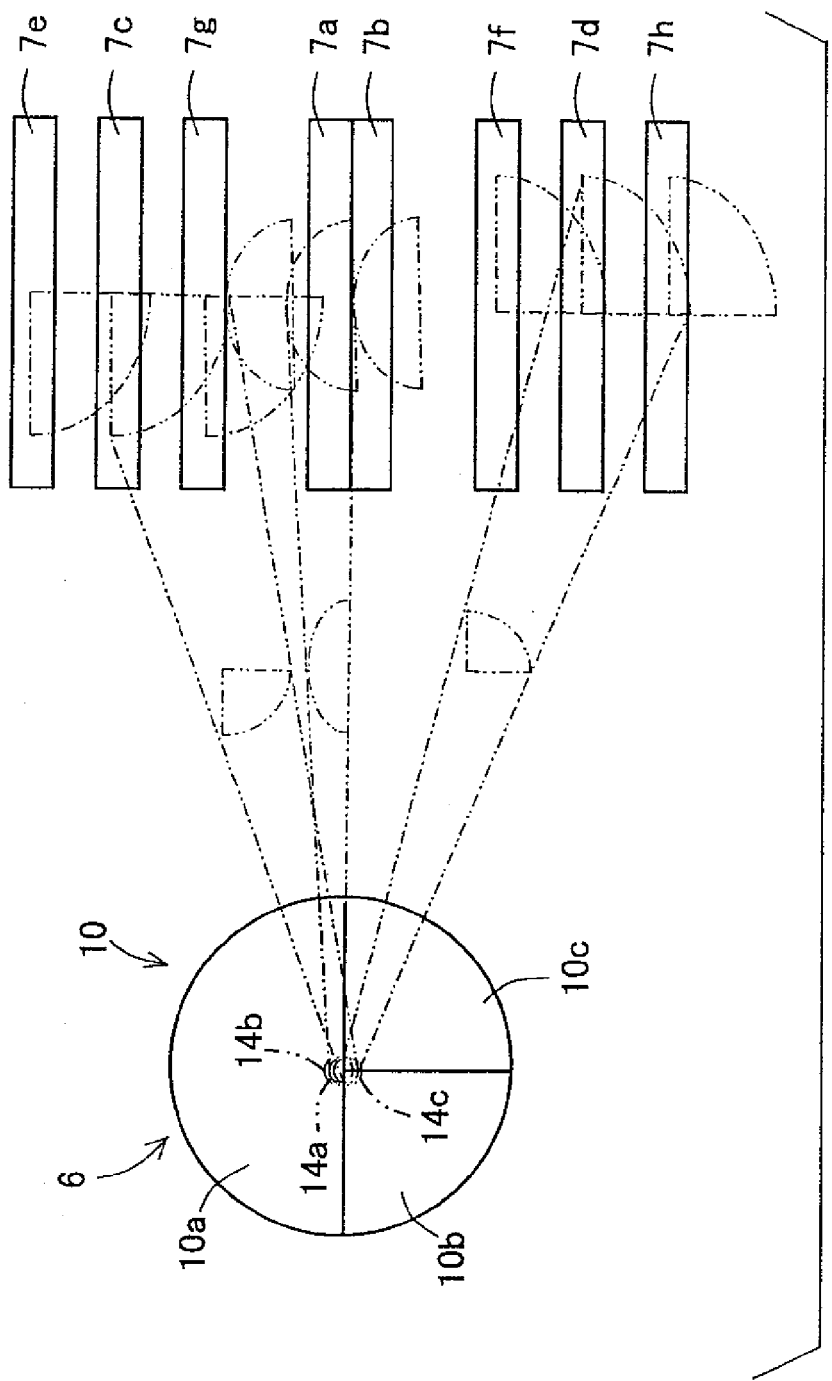
FIG. 37 is a view for explaining a reflected light from the second recording layer 9b in a state where the objective lens 5 is located at the neutral position.
Figure 38:
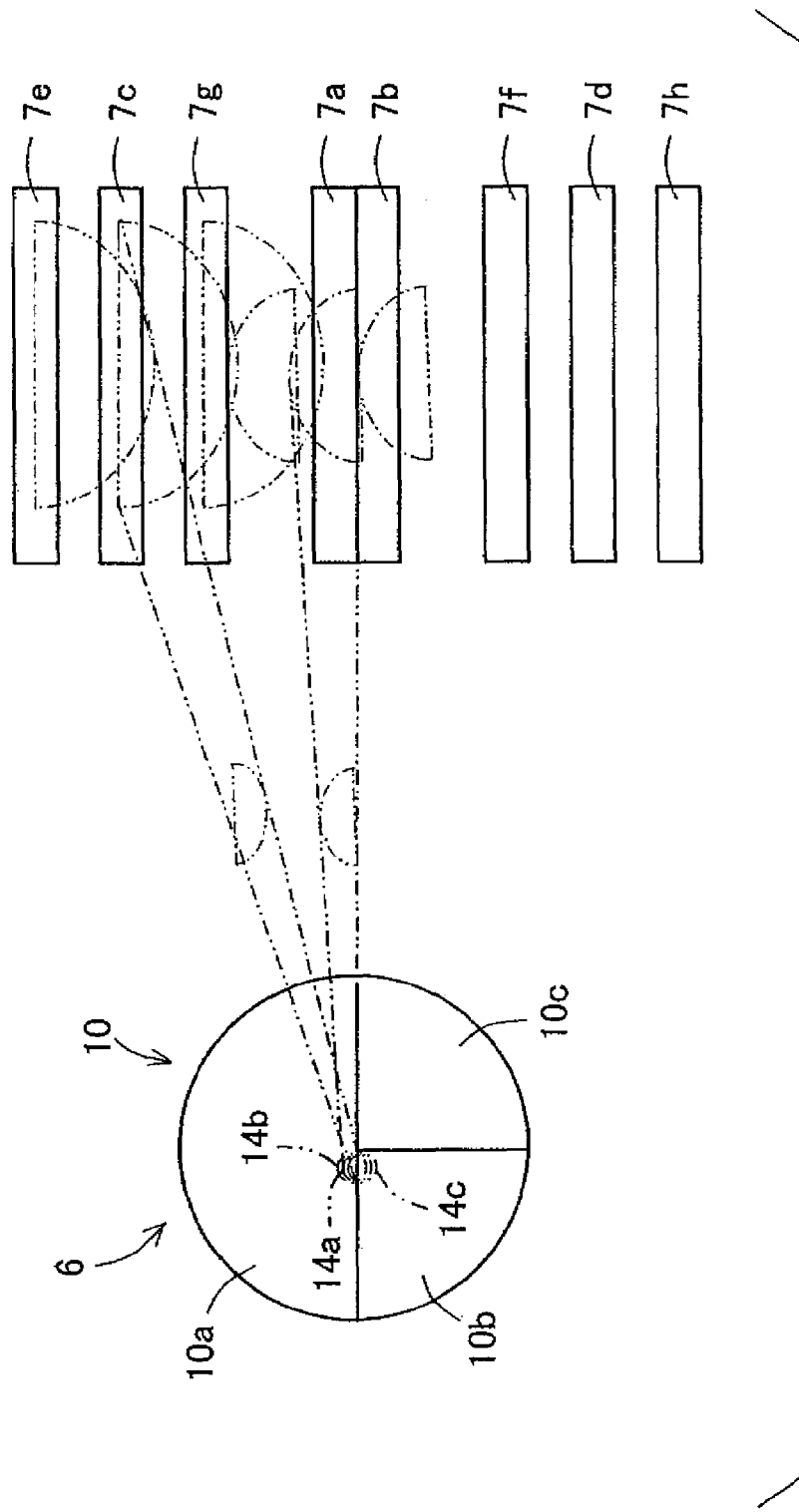
FIG. 38 is a view for explaining one example of a reflected light from the second recording layer 9b in a state where the objective lens 5 is located at a position which is shifted in the radial direction A from the neutral position.
Figure 39:
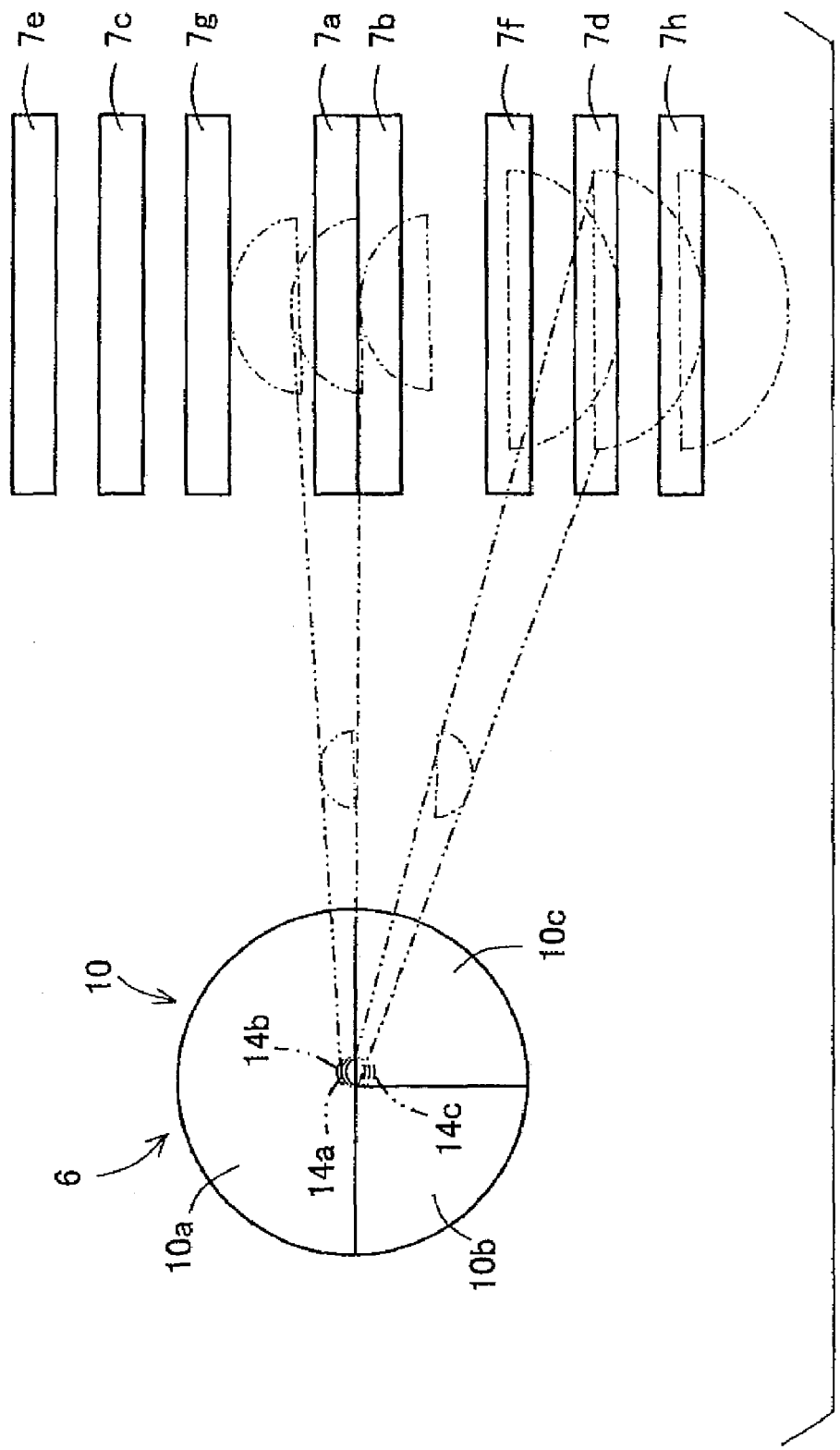
FIG. 39 is a view for explaining another example of a reflected light from the second recording layer 9b in a state where the objective lens 5 is located at the position which is shifted in the radial direction A from the neutral position.
Figure 40:
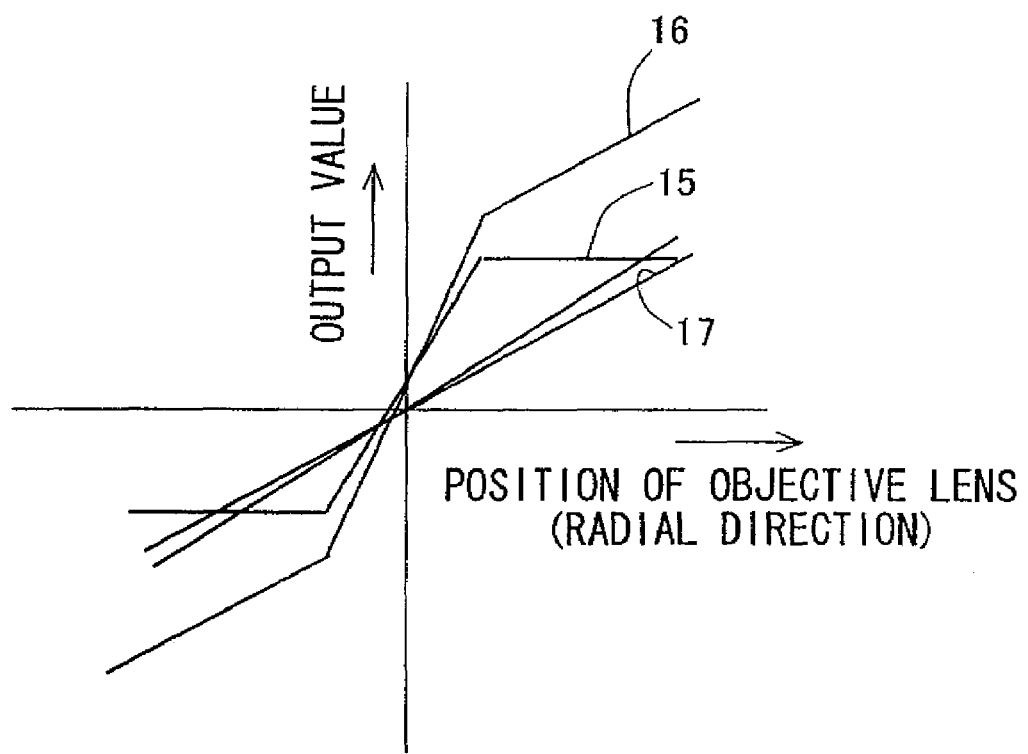
FIG. 40 is a graph showing a relation between a position of the objective lens 5 in the radial direction A, and an output value by the respective light receiving elements 7a to 7h.

FIG. 27 is a plan view showing a hologram pattern 25D according to a fifth example. In the above-described hologram pattern 25B of the third example, only the first regional portion 75 is formed so as to transmit light without diffracting the light, but the whole axial vicinity portion 38C may be formed so as to transmit light without diffracting the light as the fifth example. This prevents, in a case where the emitted light is collected onto the first recording layer 21a, the reflected light from the second recording layer 21b from entering the first and second TES splitting portions 35 and 36, and the reflected light from the recording medium 21, which enters the axial vicinity portion 38C is all transmitted without being diffracted. Consequently, the stable tracking servo can be realized by obtaining the correct track position information and shift information.

The respective embodiments described above is merely an illustration of the invention, and the configuration may be modified in a scope of the invention. For instance, a groove formed in the axial vicinity portion may be formed so that an extending direction thereof is different from extending directions of grooves formed in the first and second TES light receiving portions 35 and 36 and the FES light receiving portion 37. This prevents the reflected light from the second recording layer 21b from entering the first and second TES light receiving portions 35 and 36 and the FES light receiving portion 37 when the emitted light is collected onto the first recording layer 21a. By so doing, the stable tracking servo can also be realized by obtaining the correct track position information and shift information, and a stable focus servo can be realized by obtaining the correct focus position information.

Moreover, in the axial vicinity portion, the first regional portion may be a triangle shape, a rectangular shape, a trapezoidal shape, and the like as long as it is a symmetric shape with respect to the second virtual plane 41. Further, in the respective embodiments, the configuration is such that the main beam 30 and the sub beam 31 are used, but even if there is only one beam, the same effect can be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, by an optical configuration including light collecting means, splitting means, and the like, even when a reflected light from the other recording layers except for one recording layer is irradiated in a state of being focused on the splitting means, the reflected light from the other recording layers is led to an axial vicinity portion and prevented from entering first and second splitting portions. This prevents the reflected light from the other recording layers from being received by first and second TES light receiving portions, so that correct track position information and shift information can be reliably obtained. By obtaining the correct shift information, it is possible to solve troubles such that the light collecting means is driven beyond a movable range. Furthermore, by obtaining the correct track position information and shift information, the light collecting means can be correctly controlled, and thereby a light collection position of an emitted light in a recording medium can be correctly controlled. Consequently, a stable track servo can be realized.

Moreover, according to the invention, even when the light collecting means is made to be displaced in a direction perpendicular to the optical axis of the emitted light led to the light collecting means so that the light collection position of the emitted light in the recording medium is changed, the reflected light reflected by the other recording layers is prevented from being led to the first and second splitting portions, and can be reliably led to only the axial vicinity portion.

Moreover, according to the invention, in a case where the light collection position of the emitted light is located on the one recording layer, the reflected light reflected by the other recording layers is irradiated onto the splitting means in a radiation range which is smaller than that of the reflected light reflected by the one recording layer. This makes it possible to make a region in which the axial vicinity portion is formed, as small as possible, and to make a light intensity of the reflected light led to the first and second splitting portions, as high as possible.

Moreover, according to the invention, a light source is configured so as to emit light whose central wavelength is within a wavelength range of 650 nanometer or more and 660 nanometer or less and therefore, convenience can be enhanced with respect to the recording medium such as a digital versatile disk (abbreviated as DVD), for instance.

Moreover, according to the invention, even in a case of using a main light flux and a sub light flux, the main light flux and the sub light flux which are reflected by the other recording layers can be led to only the axial vicinity portion after preventing the light fluxes from being led to the first and second splitting portions. This makes it possible to reliably obtain the correct tracking position information and shift information.

Moreover, according to the invention, in a case where control means obtains focus position information in accordance with a knife-edge method based on a light receiving result due to a third light receiving portion, it is possible to enhance convenience by, for instance, obtaining the correct focus position information.

Moreover, according to the invention, in a case where the control means obtains the track position information in accordance with a phase contrast method based on the result of the light reception by the first light receiving portion and the result of the light reception by the second light receiving portion, it is possible to enhance convenience by, for instance, obtaining the correct track position information.

Moreover, according to the invention, in a case where the control means obtains the track position information in accordance with a differential push pull method based on the result of the light reception by the first light receiving portion and the result of the light reception by the second light receiving portion, it is possible to enhance convenience by, for instance, obtaining the correct track position information.

Moreover, according to the invention, the axial vicinity portion is a circular portion having a splitting axial line as a center and therefore, the reflected light from the other recording layers is made to enter the axial vicinity portion so as to reliably prevent the reflected light from entering the first and second splitting portions.

Moreover, according to the invention, by providing an optical emitter comprising the light source, splitting means, and light receiving means on an optical pickup apparatus, even when the reflected light from the other recording layers except for the one recording layer is irradiated in a state of being focused on the splitting means, the reflected light from the other recording layers is led to the axial vicinity portion, and prevented from entering the first and second splitting portions. This makes it possible to prevent the reflected light from being received by the first and second light receiving portions, so that the correct track information and shift information can be reliably obtained. By obtaining the correct shift information, it is possible to solve troubles such that the light collecting means is driven beyond the movable range. Furthermore, by obtaining the correct track position information and shift information, the light collecting means can be correctly controlled, and thereby the light collection position of the emitted light in the recording medium can be correctly controlled. Consequently, the stable track servo can be realized.

Moreover, in the splitting means of a light emitter, the axial vicinity portion is formed in a region including a mobilization regional portion at the time that a radiation range of the reflected light reflected by the other recording layers is displaced along with the displacement of the light collecting means, in a case where the radiation range of the reflected light reflected by the other recording layers except for the one recording layer is smaller than the radiation range of the reflected light reflected by the one recording layer. By so doing, the reflected light reflected by the other recording layers is prevented from being led to the first and second splitting portions, and can be reliably led to only the axial vicinity portion even when the light collecting means is displaced so that the light receiving position of the emitted light in the recording medium is changed.

Moreover, according to the invention, in a case where the light collection position of the emitted light is located on the one recording layer, the reflected light reflected by the other recording layers is irradiated onto the splitting means of the light emitter in the radiation range which is smaller than that of the reflected light reflected by the one recording layer. This makes it possible to make the region in which the axial vicinity portion is formed, as small as possible, and to make the light intensity of the reflected light led to the first and second splitting portions, as high as possible.

Moreover, according to the invention, a light source of the light emitter is configured so as to emit light whose central wavelength is within a wavelength range of 650 nanometer or more and 660 nanometer or less and therefore, convenience can be enhanced with respect to the recording medium such as a digital versatile disk (abbreviated as DVD), for instance.

Moreover, according to the invention, even in a case of using a main light flux and a sub light flux, the main light flux and the sub light flux which are reflected by the other recording layers can be led to only the axial vicinity portion after preventing the light fluxes from being led to the first and second splitting portions. This makes it possible to reliably obtain the correct main information and position information.

Moreover, according to the invention, the light emitter is provided on an optical pickup apparatus for obtaining the focus position information in accordance with a knife-edge method based on the result of the light reception by the third light receiving portion. This makes it possible to enhance convenience by, for instance, obtaining the correct focus position information.

Moreover, according to the invention, the light emitter is provided on the optical pickup apparatus for obtaining the track position information in accordance with a phase contrast method based on the result of the light reception by the first light receiving portion and the result of the light reception by the second light receiving portion. This makes it possible to enhance convenience by, for instance, obtaining the correct track position information.

Moreover, according to the invention, the light emitter is provided on the optical pickup apparatus for obtaining the track position information in accordance with a differential push pull method based on the result of the light reception by the first light receiving portion and the result of the light reception by the second light receiving portion. This makes it possible to enhance convenience by, for instance, obtaining the correct track position information.

Moreover, according to the invention, an axial vicinity portion of the light emitter is a circular portion having a splitting axial line as a center and therefore, the reflected light from the other recording layers is made to enter the axial vicinity portion so as to reliably prevent the reflected light from entering the first and second splitting portions.

Moreover, according to the invention, the light emitter has a polarizing property of transmitting the emitted light from the light source and the reflected light from the recording medium without splitting the lights by the splitting means, and splitting the lights by the splitting means based on respective polarizing directions thereof. This makes it possible to enhance the usability of the light by, for instance, removing the loss of the light intensity at the time that the emitted light from the light source is irradiated onto the recording medium.

Moreover, according to the invention, the emitted light from the light source is led to the recording medium by light guiding means without the splitting means along the path and therefore, the usability of the light can be enhanced.

Moreover, according to the invention, by polarizing direction changing means, the emitted light from the light source can be transmitted without being diffracted by an optical component interposed between the light source and the recording medium, and the reflected light from the recording medium can be diffracted and reflected by the optical component. This makes it possible to enhance the usability of the light.

Moreover, according to the invention, by providing a splitter having first and second splitting portions on the optical pickup apparatus, even when the reflected light from the other recording layers is irradiated in a state of being focus on the splitter, the reflected light from the other recording layers is led to the axial vicinity portion, and prevented from entering the first and second splitting portions. This prevents the reflected light from being received by the first light receiving portion and the second light receiving portion so that the correct track position information and shift information can be reliably obtained. By obtaining the correct shift information, it is possible to solve troubles such that the light collecting means is driven beyond the movable range. Furthermore, by obtaining the correct track position information and shift information, the light collecting means can be correctly controlled, and thereby the light collection position of the emitted light in the recording medium can be correctly controlled. Consequently, the stable track servo can be realized.

The invention claimed is:

1. An optical pickup apparatus for recording and/or reproducing main information by irradiating with light a recording medium formed of a plurality of recording layers, the optical pickup apparatus comprising:

a light source;

a light collector configured to collect emitted light emitted from the light source onto one recording layer of the recording medium, the light collector being provided so as to be displaceable in a variable direction perpendicular to an optical axis of the emitted light within a movable range including a neutral position centering on the optical axis of the emitted light led to the light collector, the light collector being configured to change, by the displacement in the movable direction, a light collection position in the recording medium of the emitted light;

a light receiver configured to receive reflected light reflected by the recording medium, the light receiver having first and second light receiving portions configured to obtain track position information which is information of the light collection position of the emitted light with respect to a direction parallel to the recording layer, and shift information of the light collector from the neutral position, and a third light receiving portion configured to obtain focus position information which is information of the light collection position of the emitted light with respect to a direction perpendicular to the recording layer;

a splitter having a first splitting portion, a second splitting portion, and a third splitting portion, configured to lead the reflected light via the light collector and split the reflected light on the respective first to third splitting portions, the first splitting portion leading the reflected light to the first light receiving portion, the second splitting portion leading the reflected light to the second light receiving portion, the third splitting portion leading the reflected light to the third light receiving portion, the first and second splitting portions being disposed in a residual region excluding an axial vicinity portion in a vicinity of a splitting axial line corresponding to an optical axis of the reflected light led to the splitter when the light collector is located at the neutral position, wherein the axial vicinity portion is formed in a region including a mobilization regional portion at the time that a radiation range of the reflected light reflected by other recording layers is displaced along with the displacement of the light collector, in a case where the radiation range of the reflected light reflected by the other recording layers except for the one recording layer is smaller than a radiation range of the reflected light reflected by the one recording layer; and a controller configured to obtain the track position information and shift information by a result of light reception by the light receiver and control the light collection position of the emitted light in the recording medium by controlling a position of the light collector based on the track position information and shift information.

2. The optical pickup apparatus of claim 1, wherein in a case where the light collection position of the emitted light is located on the one recording layer, the reflected light reflected by other recording layers is irradiated onto the splitter in the radiation range which is smaller than that of the reflected light reflected by the one recording layer.

3. The optical pickup apparatus of claim 1 or 2, wherein the light source emits light whose central wavelength is within a wavelength range of 650 nanometer or more and 660 nanometer or less.

4. The optical pickup apparatus of any one of claims 1 or 2-3, further comprising a diffractor interposed between the light source and the light collector, the diffractor being configured to partly diffract the emitted light and form a main beam for obtaining the main information recorded on the recording medium and a sub beam for obtaining the position information for controlling the light collection position of the main beam.

5. The optical pickup apparatus of any one of claims 1 or 2-4, wherein the controller obtains the focus position information in accordance with a knife-edge method based on the result of the light reception by the third light receiving portion, and controls the position of the light collector based on the focus position information, and thereby the light collection position of the emitted light in the recording medium is controlled.

6. The optical pickup apparatus of any one of claims 1 or 2-5, wherein the controller obtains the track position information in accordance with a phase contrast method based on the result of the light reception by the first light receiving portion and the result of the light reception by the second light receiving portion, and controls the position of the light collector, and thereby the light collection position of the emitted light in the recording medium is controlled.

7. The optical pickup apparatus of any one of claims 1 or 2-5, wherein the controller obtains the track position information in accordance with a differential push pull method based on the result of the light reception by the first light receiving portion and the result of the light reception by the second light receiving portion, and controls the position of the light collector, and thereby the light collection position of the emitted light in the recording medium is controlled.

8. The optical pickup apparatus of any one of claims 1 or 2-7, wherein the axial vicinity portion is a circular portion having a splitting axial line as a center.

* * * * *